United States Patent
Hazlewood et al.

(10) Patent No.: US 9,514,244 B2
(45) Date of Patent: Dec. 6, 2016

(54) DYNAMIC ASSIGNMENT OF BUSINESS LOGIC BASED ON SCHEMA MAPPING METADATA

(71) Applicant: International Business Machines Corporation, Armonk, NY (US)

(72) Inventors: Stephanie J. Hazlewood, Toronto (CA); Mohammad Khatibi, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 13/873,086

(22) Filed: Apr. 29, 2013

(65) Prior Publication Data

US 2014/0324857 A1  Oct. 30, 2014

(51) Int. Cl.
*G06F 17/30* (2006.01)

(52) U.S. Cl.
CPC ... *G06F 17/30917* (2013.01); *G06F 17/30076* (2013.01); *G06F 17/30292* (2013.01); *G06F 17/30595* (2013.01); *G06F 17/30997* (2013.01)

(58) Field of Classification Search
CPC ............... G06F 17/30557; G06F 17/30917; G06F 17/2247; G06F 17/30292; G06F 17/30525; G06F 17/3056; G06F 17/30914; G06F 17/3092; G06F 17/30923; G06F 17/30286; G06F 17/30563; G06F 17/30569; G06F 17/30604
USPC ........................ 707/601, 694, 736
See application file for complete search history.

(56) References Cited

U.S. PATENT DOCUMENTS

| | | | |
|---|---|---|---|
| 7,433,887 B2 | 10/2008 | Thakkar et al. | |
| 7,596,573 B2 | 9/2009 | O'Neil et al. | |
| 7,716,190 B2 * | 5/2010 | Mendis | G06F 17/30569 707/694 |
| 7,739,223 B2 | 6/2010 | Vaschillo et al. | |
| 7,912,874 B2 | 3/2011 | Charlet et al. | |

(Continued)

FOREIGN PATENT DOCUMENTS

JP  4847689  12/2011

OTHER PUBLICATIONS

US Patent Application, dated Sep. 23, 2014, for U.S. Appl. No. 14/494,158, invented by Stephanie J. Hazlewood et al., Total 70 pages.

(Continued)

*Primary Examiner* — Michelle Owyang
(74) *Attorney, Agent, or Firm* — Janaki K. Davda; Konrad, Raynes, Davda and Victor LLP

(57) ABSTRACT

Provided are techniques for dynamic assignment of business logic based on schema mapping metadata. A first transformation is performed using a simplified map and a structural transformation map that maps attributes between a source system and a target system to generate simplified map data that includes source attribute and target attribute pairs. A document that includes combined data is generated using the simplified map data and source system metadata containing contextual values of the source system. A second transformation is performed to generate transformed contextual metadata containing contextual values for the target system using a contextual metadata transformation map and the combined data.

8 Claims, 40 Drawing Sheets

(56) References Cited

U.S. PATENT DOCUMENTS

| | | | |
|---|---|---|---|
| 8,082,243 B2* | 12/2011 | Gorelik | G06F 17/30292 707/713 |
| 8,086,560 B2* | 12/2011 | Hernandez-Sherrington | G06F 17/218 707/601 |
| 8,234,312 B2 | 7/2012 | Thomas | |
| 8,688,752 B2* | 4/2014 | Solovey et al. | 707/809 |
| 2002/0023097 A1* | 2/2002 | Ripley | G06F 17/3092 |
| 2004/0199905 A1 | 10/2004 | Fagin et al. | |
| 2005/0050068 A1 | 3/2005 | Vaschillo et al. | |
| 2006/0190931 A1 | 8/2006 | Scott et al. | |
| 2008/0065678 A1 | 3/2008 | Petri | |
| 2008/0154927 A1* | 6/2008 | Johnson | G06F 17/30563 |
| 2008/0228799 A1* | 9/2008 | Fagin | G06F 17/227 |
| 2008/0281820 A1* | 11/2008 | Do | G06F 17/303 |
| 2009/0024587 A1* | 1/2009 | Kamani | G06F 17/30613 |
| 2009/0281792 A1* | 11/2009 | Green | G06F 17/30436 704/9 |
| 2011/0184959 A1* | 7/2011 | Maxwell, III | G06F 19/324 707/754 |
| 2012/0109988 A1 | 5/2012 | Li et al. | |
| 2012/0143923 A1 | 6/2012 | Whitney et al. | |
| 2012/0254739 A1* | 10/2012 | Dehmann | G06F 17/30917 715/255 |
| 2013/0055235 A1* | 2/2013 | Eska | G06F 8/751 717/173 |
| 2013/0086118 A1* | 4/2013 | Ware et al. | 707/792 |
| 2014/0067363 A1* | 3/2014 | Ogren | G06F 17/2282 704/2 |
| 2014/0229628 A1* | 8/2014 | Mandal | 709/231 |

OTHER PUBLICATIONS

Preliminary Amendment, dated Sep. 23, 2014, for U.S. Appl. No. 14/494,158, invented by Stephanie J. Hazlewood et al., Total 5 pages.

Kolaitis, P., "Schema Mappings, Data Exchange, and Metadata Management", IBM Almaden Research Center, PODS 2005, Jun. 13-15, 2005, Baltimore, Maryland, Copyright 2005 ACM, Total 15 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Nallapati, R. et al., "Extraction of Key Words from News Stories", 2004, Center for Intelligent Information Retrieval Department of Computer Science, University of Massachusetts, pp. 1-6.

Qian, L. et al., "Sample-Driven Schema Mapping", SIGMOD'12, May 20-24, 2012, Scottsdale, Arizona, USA, Copyright 2012 ACM, Total 12 pp.

Machine translation for JP4847689, published Dec. 28, 2011, Total 30 pp. (Also, English counterparts are: U.S. Pat. No. 7,739,223 and US 20050050068).

Marujo, L. et al., "Recognition of Named-Event Passages in News Articles", Proceedings of COLING 2012: Demonstration Papers, Mumbai, Dec. 2012, Total 8 pp.

Office Action, dated May 21, 2015, for U.S. Appl. No. 14/494,158, filed sep. 23, 2014, invented by Stephanie J. Hazelwood et al., Total 20 pages.

Response to Office Action, dated Aug. 21, 2015, for U.S. Appl. No. 14/494,158, filed Sep. 23, 2014, invented by Stephanie J. Hazelwood et al., Total 17 pages.

Final Office Action, dated Dec. 1, 2015, for U.S. Appl. No. 14/494,158, filed Sep. 23, 2014, invented by Stephanie J. Hazelwood et al., Total 22 pages.

Response to Final Office Action, dated Mar. 1, 2016, for U.S. Appl. No. 14/494,158, filed Sep. 23, 2014, invented by Stephanie J. Hazelwood et al., Total 10 pages.

Office Action, dated Apr. 5, 2016, for U.S. Appl. No. 14/494,158, filed Sep. 23, 2014, invented by Stephanie J. Hazelwood et al., Total 22 pages.

Response to Office Action, dated Jul. 5, 2016, for U.S. Appl. No. 14/494,158, filed Sep. 23, 2014, invented by Stephanie J. Hazelwood et al., Total 10 pages.

Notice of Allowance, dated Aug. 8, 2016, for U.S. Appl. No. 14/494,158 (54.108C1), filed Sep. 23, 2014, invented by Stephanie J. Hazelwood et al., Total 16 pages.

* cited by examiner

VirtualPerson.map

```xml
<?xml version="1.0" encoding="UTF-8"?><mappingRoot domainID=
"com.ibm.msl.mapping.xml" mainMap="true" targetNamespace=
"http://www.ibm.com/mdm/virtual" version="8.0.0" xmlns=
"http://www.ibm.com/2008/ccl/Mapping" xmlns:map
"http://www.ibm.com/mdm/virtual">
   <input path="/schema.virtual/VirtualMDM.xsd" var="in1"/>
   <input path="http://www.w3.org/2001/XMLSchema" var="in"/>
   <output path="/schema.physical/MDMDomains.xsd"/>
   <namespaces>
      <namespace kind="extension" prefix="str" uri=
"http://exslt.org/strings"/>
      <namespace kind="extension" prefix="date" uri=
"http://exslt.org/dates-and-times"/>
   </namespaces>
   <mappingDeclaration name="VirtualPerson">
      <input namespace="http://www.ibm.com/mdm/virtual" path=
"$in1/mdmper" var="mdmper"/>
      <output namespace="http://www.ibm.com/mdm/schema" path=
"TCRMPersonBObj"/>
      <variables>
         <variable as="$in/type('string')" value="exsl:node-set(document
('transcoding/transcode.xml'))" var="transcodeXML"/>
      </variables>
      <move>
         <input path="$mdmper/entRecno" var="entRecno"/>
         <output path="EntityId"/>
      </move>
      <foreach>
         <input path="$mdmper/MemHead" var="MemHead"/>
         <output path="TCRMAdminContEquivBObj"/>
         <filter lang="xpath">$MemHead[memStat='A']</filter>
         <move>
            <input path="$MemHead/memIdnum"/>
            <output path="AdminPartyId"/>
         </move>
```

FIG. 6A

```
            <move>
                <input path="$MemHead/srcCode" var="srcCode"/>
                <output path="AdminSystemValue"/>
            </move>
        </foreach>
        <foreach>
            <input path="$mdmper/PERNAME" var="PERNAME"/>
            <output path="TCRMPersonNameBObj"/>
            <filter lang="xpath">$PERNAME[recStat='A']</filter>
            <expression>
                <input path="$PERNAME/attrCode" var="attrCode"/>
                <output path="NameUsageType"/>
                <code lang="xpath">$transcodeXML/transcodeCollection
/transcodeObject[@virtual='PERNAME']/transcode[@virtual
=$attrCode]/@physical</code>
            </expression>
            <move>
                <input path="$PERNAME/lastname"/>
                <output path="LastName"/>
            </move>
            <move>
                <input path="$PERNAME/givenname1"/>
                <output path="GivenNameOne"/>
            </move>
            <move>
                <input path="$PERNAME/givenname2"/>
                <output path="GivenNameTwo"/>
            </move>
            <move>
                <input path="$PERNAME/givenname3"/>
                <output path="GivenNameThree"/>
            </move>
            <expression>
                <input path="$PERNAME/prefix" var="prefix"/>
                <output path="PrefixType"/>
```

```xml
        <code lang="xpath">$transcodeXML/transcodeCollection
/transcodeObject[@virtual='PREFIXNAME']
/transcode[@virtual=$prefix]/@physical</code>
      </expression>
      <expression>
        <input path="$PERNAME/generation" var="generation"/>
        <output path="GenerationType"/>
        <code lang="xpath">$transcodeXML/transcodeCollection
/transcodeObject[@virtual='GENERATION']
/transcode[@virtual=$generation]/@physical</code>
      </expression>
      <move>
        <input path="$PERNAME/suffix"/>
        <output path="Suffix"/>
      </move>
      <if>
        <input path="$PERNAME/recStat" var="recStat"/>
        <output path="StartDate" var="StartDate"/>
        <output path="EndDate" var="EndDate"/>
        <test lang="xpath">$recStat[text()='D']</test>
        <expression>
          <input path="$recStat/." var="recStat"/>
          <output path="$StartDate/."/>
          <code lang="xpath">concat(date:format-date
(date:date-time( ) , 'yyyy-MM-dd hh:mm:'), '01.000')</code>
        </expression>
        <expression>
          <input path="$recStat/." var="recStat1"/>
          <output path="$EndDate/."/>
          <code lang="xpath">concat(date:format-date
(date:date-time( ) , 'yyyy-MM-dd hh:mm:'), '02.000')</code>
        </expression>
      </if>
    </foreach>
    <foreach>
```

FIG. 6C

```
<input path="$mdmper/PERADDR" var="PERADDR"/>
<output path="TCRMPartyAddressBObj"/>
<filter lang="xpath">$PERADDR[recStat='A']</filter>
<expression>
    <input path="$PERADDR/attrCode" var="attrCode1"/>
    <output path="AddressUsageType"/>
    <code lang="xpath">$transcodeXML/transcodeCollection
/transcodeObject[@virtual='PERADDR']
/transcode[@virtual=$attrCode1]/@physical</code>
</expression>
<move>
    <input path="$PERADDR/addrline1"/>
    <output path="TCRMAddressBObj/AddressLineOne"/>
</move>
<move>
    <input path="$PERADDR/addrline2"/>
    <output path="TCRMAddressBObj/AddressLineTwo"/>
</move>
<move>
    <input path="$PERADDR/addrline3"/>
    <output path="TCRMAddressBObj/AddressLineThree"/>
</move>
<move>
    <input path="$PERADDR/residencenum"/>
    <output path="TCRMAddressBObj/ResidenceNumber"/>
</move>
<move>
    <input path="$PERADDR/city"/>
    <output path="TCRMAddressBObj/City"/>
</move>
<expression>
    <input path="$PERADDR/provstate" var="provstate"/>
    <output path="TCRMAddressBObj/ProvinceStateType"/>
```

```
            <code lang="xpath">$transcodeXML/transcodeCollection
/transcodeObject[@virtual='PROVSTATE']/transcode[@virtual=$provstate]
/@physical</code>
        </expression>
        <move>
            <input path="$PERADDR/postalcode"/>
            <output path="TCRMAddressBObj/ZipPostalCode"/>
        </move>
        <expression>
            <input path="$PERADDR/country" var="country"/>
            <output path="TCRMAddressBObj/CountryType"/>
            <code lang="xpath">$transcodeXML/transcodeCollection
/transcodeObject[@virtual='COUNTRY']/transcode[@virtual=$country]
/@physical</code>
        </expression>
        <move>
            <input path="$PERADDR/latitude"/>
            <output path="TCRMAddressBObj/LatitudeDegrees"/>
        </move>
        <move>
            <input path="$PERADDR/longitude"/>
            <output path="TCRMAddressBObj/LongitudeDegrees"/>
        </move>
        <if>
            <input path="$PERADDR/recStat" var="recStat2"/>
            <output path="StartDate" var="StartDate1"/>
            <output path="EndDate" var="EndDate1"/>
            <test lang="xpath">$recStat2[text()='D']</test>
            <expression>
                <input path="$recStat2/." var="recStat2"/>
                <output path="$StartDate1/."/>
                <code lang="xpath">concat(date:format-date
(date:date-time( ) , 'yyyy-MM-dd hh:mm:'), '01.000')</code>
            </expression>
            <expression>
```

FIG. 6E

```
            <input path="$recStat2/." var="recStat3"/>
            <output path="$EndDate1/."/>
            <code lang="xpath">concat(date:format-date
(date:date-time( ) , 'yyyy-MM-dd hh:mm:'), '02.000')</code>
          </expression>
      </if>
   </foreach>
   <foreach>
      <input path="$mdmper/PERIDENT" var="PERIDENT"/>
      <output path="TCRMPartyIdentificationBObj"/>
      <filter lang="xpath">$PERIDENT[recStat='A']</filter>
      <expression>
         <input path="$PERIDENT/attrCode" var="attrCode2"/>
         <output path="IdentificationType"/>
         <code lang="xpath">$transcodeXML/transcodeCollection
/transcodeObject[@virtual='PERIDENT']
/transcode[@virtual=$attrCode2]/@physical</code>
      </expression>
      <move>
         <input path="$PERIDENT/idnum"/>
         <output path="IdentificationNumber"/>
      </move>
      <move>
         <input path="$PERIDENT/expirydate"/>
         <output path="IdentificationExpiryDate"/>
      </move>
      <if>
         <input path="$PERIDENT/recStat" var="recStat12"/>
         <output path="StartDate" var="StartDate6"/>
         <output path="EndDate" var="EndDate6"/>
         <test lang="xpath">$recStat12[text()='D']</test>
         <expression>
            <input path="$recStat12/." var="recStat12"/>
            <output path="$StartDate6/."/>
```

```
            <code lang="xpath">concat(date:format-date
(date:date-time( ) , 'yyyy-MM-dd hh:mm:'), '01.000')</code>
        </expression>
        <expression>
            <input path="$recStat12/." var="recStat13"/>
            <output path="$EndDate6/."/>
            <code lang="xpath">concat(date:format-date
(date:date-time( ) , 'yyyy-MM-dd hh:mm:'), '02.000')</code>
        </expression>
    </if>
</foreach>
<foreach>
    <input path="$mdmper/PERPHONE" var="PERPHONE"/>
    <output path="TCRMPartyContactMethodBObj"/>
    <filter lang="xpath">$PERPHONE[recStat='A']</filter>
    <expression>
        <input path="$PERPHONE/attrCode" var="attrCode3"/>
        <output path="ContactMethodUsageType"/>
        <code lang="xpath">$transcodeXML/transcodeCollection
/transcodeObject[@virtual='PERPHONE']/transcode[@virtual
=$attrCode3]/@physical</code>
    </expression>
    <assign value="1">
        <output path="TCRMContactMethodBObj
/ContactMethodType"/>
    </assign>
    <expression>
        <input path="$PERPHONE/phicc" var="phicc1"/>
        <input path="$PERPHONE/pharea" var="pharea1"/>
        <input path="$PERPHONE/refnum" var="refnum1"/>
        <input path="$PERPHONE/phext" var="phext1"/>
        <output path="TCRMContactMethodBObj
/ReferenceNumber"/>
```

FIG. 6G

```
<code lang="xpath">concat
($phicc1,' ',$phorea1,' ',$refnum1,' ',$phext1)</code>
    </expression>
    <if>
        <input path="$PERPHONE/recStat" var="recStat4"/>
        <output path="StartDate" var="StartDate2"/>
        <output path="EndDate" var="EndDate2"/>
        <test lang="xpath">$recStat4[text()='D']</test>
        <expression>
            <input path="$recStat4/." var="recStat4"/>
            <output path="$StartDate2/."/>
            <code lang="xpath">concat(date:format-date
(date:date-time( ), 'yyyy-MM-dd hh:mm:'), '01.000')</code>
        </expression>
        <expression>
            <input path="$recStat4/." var="recStat5"/>
            <output path="$EndDate2/."/>
            <code lang="xpath">concat(date:format-date
(date:date-time( ), 'yyyy-MM-dd hh:mm:'), '02.000')</code>
        </expression>
    </if>
</foreach>
<foreach>
    <input path="$mdmper/PEREMAIL" var="PEREMAIL"/>
    <output path="TCRMPartyContactMethodBObj"/>
    <filter lang="xpath">$PEREMAIL[recStat='A']</filter>
    <expression>
        <input path="$PEREMAIL/attrCode" var="attrCode4"/>
        <output path="ContactMethodUsageType"/>
        <code lang="xpath">$transcodeXML/transcodeCollection
/transcodeObject[@virtual='PEREMAIL']/transcode[@virtual=$attrCode4]
/@physical</code>
    </expression>
    <move>
        <input path="$PEREMAIL/email"/>
```

FIG. 6H

```
            <output path="TCRMContactMethodBObj
/ReferenceNumber"/>
        </move>
        <assign value="2">
            <output path="TCRMContactMethodBObj
/ContactMethodType"/>
        </assign>
        <if>
            <input path="$PEREMAIL/recStat" var="recStat6"/>
            <output path="StartDate" var="StartDate3"/>
            <output path="EndDate" var="EndDate3"/>
            <test lang="xpath">$recStat6[text()='D']</test>
            <expression>
                <input path="$recStat6/." var="recStat6"/>
                <output path="$StartDate3/."/>
                <code lang="xpath">concat(date:format-date
(date:date-time( ) , 'yyyy-MM-dd hh:mm:'), '01.000')</code>
            </expression>
            <expression>
                <input path="$recStat6/." var="recStat7"/>
                <output path="$EndDate3/."/>
                <code lang="xpath">concat(date:format-date
(date:date-time( ) , 'yyyy-MM-dd hh:mm:'), '02.000')</code>
            </expression>
        </if>
    </foreach>
    <foreach>
        <input path="$mdmper/PERBANK" var="PERBANK"/>
        <output path="TCRMFinancialProfileBObj
/TCRMPartyBankAccountBObj"/>
        <filter lang="xpath">$PERBANK[recStat='A']</filter>
        <expression>
            <input path="$PERBANK/attrCode" var="attrCode5"/>
            <output path="AccountType"/>
```

FIG. 6I

```
                <code lang="xpath">$transcodeXML/transcodeCollection
/transcodeObject[@virtual='PERBANK']/transcode[@virtual=$attrCode5]
/@physical</code>
        </expression>
        <move>
            <input path="$PERBANK/acctnum"/>
            <output path="AccountNumber"/>
        </move>
        <move>
            <input path="$PERBANK/branchnum"/>
            <output path="BranchNumber"/>
        </move>
        <move>
            <input path="$PERBANK/banknum"/>
            <output path="BankNumber"/>
        </move>
        <if>
            <input path="$PERBANK/recStat" var="recStat8"/>
            <output path="StartDate" var="StartDate4"/>
            <output path="EndDate" var="EndDate4"/>
            <test lang="xpath">$recStat8[text()='D']</test>
            <expression>
                <input path="$recStat8/." var="recStat8"/>
                <output path="$StartDate4/."/>
                <code lang="xpath">concat(date:format-date
(date:date-time( ) , 'yyyy-MM-dd hh:mm:'), '01.000')</code>
            </expression>
            <expression>
                <input path="$recStat8/." var="recStat9"/>
                <output path="$EndDate4/."/>
                <code lang="xpath">concat(date:format-date
(date:date-time( ) , 'yyyy-MM-dd hh:mm:'), '02.000')</code>
            </expression>
        </if>
    </foreach>
```

```
<foreach>
    <input path="$mdmper/PERBANKCARD" var="PERBANKCARD"/>
    <output path="TCRMFinancialProfileBObj
/TCRMPartyChargeCardBObj"/>
    <filter lang="xpath">$PERBANKCARD[recStat='A']</filter>
    <expression>
        <input path="$PERBANKCARD/attrCode" var="attrCode6"/>
        <output path="CardType"/>
        <code lang="xpath">$transcodeXML/transcodeCollection
/transcodeObject[@virtual='PERBANKCARD']/transcode[@virtual
=$attrCode6]/@physical</code>
    </expression>
    <move>
        <input path="$PERBANKCARD/cardnum"/>
        <output path="CardNumber"/>
    </move>
    <move>
        <input path="$PERBANKCARD/expirydate"/>
        <output path="CardExpiryDate"/>
    </move>
    <if>
        <input path="$PERBANKCARD/recStat" var="recStat10"/>
        <output path="StartDate" var="StartDate5"/>
        <output path="EndDate" var="EndDate5"/>
        <test lang="xpath">$recStat10[text()='D']</test>
        <expression>
            <input path="$recStat10/." var="recStat10"/>
            <output path="$StartDate5/."/>
            <code lang="xpath">concat(date:format-date
(date:date-time( ) , 'yyyy-MM-dd hh:mm:'), '01.000')</code>
        </expression>
        <expression>
            <input path="$recStat10/." var="recStat11"/>
            <output path="$EndDate5/."/>
            <code lang="xpath">concat(date:format-date
(date:date-time( ) , 'yyyy-MM-dd hh:mm:'), '02.000')</code>
```

FIG. 6K

```
            </expression>
         </if>
      </foreach>
      <foreach>
         <input path="$mdmper/PERGENDER" var="PERGENDER"/>
         <output path="GenderType"/>
         <filter lang="xpath">$PERGENDER[attrCode='PERGENDER'
and recStat='A']</filter>
         <move>
            <input path="$PERGENDER/gender" var="gender"/>
            <output path="."/>
         </move>
      </foreach>
      <foreach>
         <input path="$mdmper/PERDATE" var="PERDATE"/>
         <output path="BirthDate"/>
         <filter lang="xpath">$PERDATE[attrCode='PERBIRTHDATE'
and recStat='A']</filter>
         <move>
            <input path="$PERDATE/val" var="val1"/>
            <output path="."/>
         </move>
      </foreach>
      <foreach>
         <input path="$mdmper/PERDATE" var="PERDATE3"/>
         <output path="DeceasedDate"/>
         <filter lang="xpath">$PERDATE3[attrCode='PERDECEASDTE'
and recStat='A']</filter>
         <move>
            <input path="$PERDATE3/val" var="val"/>
            <output path="."/>
         </move>
      </foreach>
      <foreach>
         <input path="$mdmper/PERMARITAL" var="PERMARITAL1"/>
```

FIG. 6L

```
            <output path="MaritalStatusType"/>
            <filter lang="xpath">$PERMARITAL1[attrCode='PERMARITAL'
and recStat='A']</filter>
            <expression>
                <input path="$PERMARITAL1/maritalstatus"
var="maritalstatus"/>
                <output path="."/>
                <code lang="xpath">$transcodeXML/transcodeCollection
/transcodeObject[@virtual='PERMARITAL']/transcode[@virtual
=$maritalstatus]/@physical</code>
            </expression>
        </foreach>
        <assign value="P">
            <output path="PartyType"/>
        </assign>
    </mappingDeclaration>
</mappingRoot>
```

FIG. 6M

700 simplified.virtualPerson.map.xml

```xml
<?xml version="1.0" encoding="UTF-8"?>
<out:Map xmlns:out="http://www.ibm.com/mdm/simplifiedMap"
xmlns:xs4xs="http://www.w3.org/2001/XMLSchema" xmlns:xsi="http://
www.w3.org/2001/XMLSchema-instance">
    <ObjectMap source="TCRMAdminContEquivBObj" target="MemHead">
        <AttributeMap source="AdminPartyId" target="memIdnum"/>
        <AttributeMap source="AdminSystemValue" target="srcCode"/>
    </ObjectMap>
    <ObjectMap source="TCRMPersonNameBObj" target="PERNAME">
        <AttributeMap source="LastName" target="lastname"/>
        <AttributeMap source="GivenNameOne" target="givenname1"/>
        <AttributeMap source="GivenNameTwo" target="givenname2"/>
        <AttributeMap source="GivenNameThree" target="givenname3"/>
        <AttributeMap source="Suffix" target="suffix"/>
        <AttributeMap source="StartDate" target="recStat"/>
        <AttributeMap source="EndDate" target="recStat"/>
        <AttributeMap source="NameUsageType" target="attrCode"/>
        <AttributeMap source="PrefixType" target="prefix"/>
        <AttributeMap source="GenerationType" target="generation"/>
    </ObjectMap>
    <ObjectMap source="TCRMPartyAddressBObj" target="PERADDR">
        <AttributeMap source="TCRMAddressBObj/AddressLineOne" target="addrline1"/>
        <AttributeMap source="TCRMAddressBObj/AddressLineTwo" target="addrline2"/>
        <AttributeMap source="TCRMAddressBObj/AddressLineThree" target="addrline3"/>
        <AttributeMap source="TCRMAddressBObj/ResidenceNumber" target="residencenum"/>
```

FIG. 7A

```
            <AttributeMap source="TCRMAddressBObj/City" target="city"/>
            <AttributeMap source="TCRMAddressBObj/ZipPostalCode" target="postalcode"/>
            <AttributeMap source="TCRMAddressBObj/LatitudeDegrees" target="latitude"/>
            <AttributeMap source="TCRMAddressBObj/LongitudeDegrees" target="longitude"/>
            <AttributeMap source="StartDate" target="recStat"/>
            <AttributeMap source="EndDate" target="recStat"/>
            <AttributeMap source="AddressUsageType" target="attrCode"/>
            <AttributeMap source="TCRMAddressBObj/ProvinceStateType" target="provstate"/>
            <AttributeMap source="TCRMAddressBObj/CountryType" target="country"/>
        </ObjectMap>
        <ObjectMap source="TCRMPartyIdentificationBObj" target="PERIDENT">
            <AttributeMap source="IdentificationNumber" target="idnum"/>
            <AttributeMap source="IdentificationExpiryDate" target="expirydate"/>
            <AttributeMap source="StartDate" target="recStat"/>
            <AttributeMap source="EndDate" target="recStat"/>
            <AttributeMap source="IdentificationType" target="attrCode"/>
        </ObjectMap>
        <ObjectMap source="TCRMPartyContactMethodBObj" target="PERPHONE">
            <AttributeMap source="TCRMContactMethodBObj/ContactMethodType" target="1"/>
            <AttributeMap source="StartDate" target="recStat"/>
            <AttributeMap source="EndDate" target="recStat"/>
            <AttributeMap source="ContactMethodUsageType" target="attrCode"/>
```

```xml
            <AttributeMap source="TCRMContactMethodBObj/ReferenceNumber" target="phicc,pharea,refnum,phext"/>
      </ObjectMap>
      <ObjectMap source="TCRMPartyContactMethodBObj" target="PEREMAIL">
            <AttributeMap source="TCRMContactMethodBObj/ReferenceNumber" target="email"/>
            <AttributeMap source="TCRMContactMethodBObj/ContactMethodType" target="2"/>
            <AttributeMap source="StartDate" target="recStat"/>
            <AttributeMap source="EndDate" target="recStat"/>
            <AttributeMap source="ContactMethodUsageType" target="attrCode"/>
      </ObjectMap>
      <ObjectMap source="TCRMFinancialProfileBObj/TCRMPartyBankAccountBObj" target="PERBANK">
            <AttributeMap source="AccountNumber" target="acctnum"/>
            <AttributeMap source="BranchNumber" target="branchnum"/>
            <AttributeMap source="BankNumber" target="banknum"/>
            <AttributeMap source="StartDate" target="recStat"/>
            <AttributeMap source="EndDate" target="recStat"/>
            <AttributeMap source="AccountType" target="attrCode"/>
      </ObjectMap>
      <ObjectMap source="TCRMFinancialProfileBObj/TCRMPartyChargeCardBObj" target="PERBANKCARD">
            <AttributeMap source="CardNumber" target="cardnum"/>
            <AttributeMap source="CardExpiryDate" target="expirydate"/>
            <AttributeMap source="StartDate" target="recStat"/>
            <AttributeMap source="EndDate" target="recStat"/>
            <AttributeMap source="CardType" target="attrCode"/>
      </ObjectMap>
      <ObjectMap source="TCRMPersonBObj" target="PERGENDER">
            <AttributeMap source="GenderType" target="gender"/>
      </ObjectMap>
```

FIG. 7C

```
    <ObjectMap source="TCRMPersonBObj" target="PERDATE">
        <AttributeMap source="BirthDate" target="val"/>
    </ObjectMap>
    <ObjectMap source="TCRMPersonBObj" target="PERDATE">
        <AttributeMap source="DeceasedDate" target="val"/>
    </ObjectMap>
    <ObjectMap source="TCRMPersonBObj" target="PERMARITAL">
        <AttributeMap source="MaritalStatusType" target="maritalstatus"/>
    </ObjectMap>
    <ObjectMap source="TCRMPersonBObj" target="mdmper">
        <AttributeMap source="EntityId" target="entRecno"/>
        <AttributeMap source="PartyType" target="P"/>
    </ObjectMap>
</out:Map>
```

```
SimplifiedMap.xsd
<?xml version="1.0" encoding="UTF-8"?>
<xs:schema xmlns:xs="http://www.w3.org/2001/XMLSchema"
xmlns:map="http://www.ibm.com/mdm/simplifiedMap"
targetNamespace="http://www.ibm.com/mdm/simplifiedMap">
    <xs:complexType name="attributeMapType">
        <xs:attribute name="source" type="xs:string"/>
        <xs:attribute name="target" type="xs:string"/>
    </xs:complexType>
    <xs:complexType name="objectMapType">
        <xs:sequence maxOccurs="unbounded">
            <xs:element name="AttributeMap"
type="map:attributeMapType" maxOccurs="unbounded"/>
        </xs:sequence>
        <xs:attribute name="source" type="xs:string"/>
        <xs:attribute name="target" type="xs:string"/>
    </xs:complexType>
    <xs:complexType name="mapType">
        <xs:sequence>
            <xs:element name="ObjectMap"
type="map:objectMapType" maxOccurs="unbounded"/>
        </xs:sequence>
        <xs:attribute name="source" type="xs:string"/>
    </xs:complexType>
    <xs:element name="Map" type="map:mapType"/>
</xs:schema>
```

FIG. 8

Metadata.XSD

```
<?xml version="1.0" encoding="UTF-8"?>
<xs:schema xmlns:xs="http://www.w3.org/2001/XMLSchema"
xmlns:metadata="http://www.ibm.com/mdm/metadata"
targetNamespace="http://www.ibm.com/mdm/metadata">
    <xs:complexType name="attributeType">
        <xs:attribute name="name" type="xs:string"/>
    </xs:complexType>
    <xs:complexType name="metadataType">
        <xs:sequence>
            <xs:element name="Attribute"
type="metadata:attributeType" minOccurs="0"
maxOccurs="unbounded"/>
        </xs:sequence>
        <xs:attribute name="name" type="xs:string"/>
    </xs:complexType>
    <xs:simpleType name="metadataTypeEnum">
        <xs:restriction base="xs:string">
            <xs:enumeration value="BusinessKey"/>
            <xs:enumeration value="InquiryLevel"/>
        </xs:restriction>
    </xs:simpleType>
    <xs:complexType name="metadataCollectionType">
        <xs:sequence>
            <xs:element name="Metadata"
type="metadata:metadataType" minOccurs="0"
maxOccurs="unbounded"/>
        </xs:sequence>
        <xs:attribute name="type"
type="metadata:metadataTypeEnum"/>
    </xs:complexType>
    <xs:element name="MetadataCollection"
type="metadata:metadataCollectionType"/>
</xs:schema>
```

FIG. 9

MetadataTransformationInput.xsd

```xml
<?xml version="1.0" encoding="UTF-8"?>
<xs:schema xmlns:xs="http://www.w3.org/2001/XMLSchema"
xmlns:metadata="http://www.ibm.com/mdm/metadata"
xmlns:map="http://www.ibm.com/mdm/simplifiedMap"
elementFormDefault="qualified"
attributeFormDefault="unqualified">
    <xs:import namespace="http://www.ibm.com/mdm/metadata"
schemaLocation="Metadata.xsd"/>
    <xs:import namespace="http://www.ibm.com/mdm/
simplifiedMap" schemaLocation="SimplifiedMap.xsd"/>
    <xs:element name="MetadataInput">
        <xs:complexType>
            <xs:choice minOccurs="0"
maxOccurs="unbounded">
                <xs:element name="MetadataCollection"
type="metadata:metadataCollectionType" minOccurs="0"/>
                <xs:element name="Map"
type="map:mapType" minOccurs="0"/>
            </xs:choice>
        </xs:complexType>
    </xs:element>
</xs:schema>
```

```
input.businessKey.mdmper.xml
<?xml version="1.0" encoding="UTF-8"?>
<MetadataInput xmlns:metadata="http://www.ibm.com/mdm/metadata"
xmlns:map="http://www.ibm.com/mdm/simplifiedMap"
xmlns:xsi="http://www.w3.org/2001/XMLSchema-instance"
xsi:noNamespaceSchemaLocation="MetadataTransformationInput.xsd">

<MetadataCollection type="BusinessKey">
        <Metadata name="TCRMPersonBObj">
        </Metadata>
        <Metadata name="TCRMOrganizationBObj">
        </Metadata>
        <Metadata name="TCRMAddressBObj">
            <Attribute name="AddressLineOne"/>
            <Attribute name="AddressLineThree"/>
            <Attribute name="AddressLineTwo"/>
            <Attribute name="City"/>
            <Attribute name="CountryType"/>
            <Attribute name="ProvinceStateType"/>
            <Attribute name="ZipPostalCode"/>
        </Metadata>
        <Metadata name="TCRMAdminContEquivBObj">
            <Attribute name="AdminPartyId"/>
            <Attribute name="AdminSystemType"/>
        </Metadata>
        <Metadata name="TCRMContactMethodBObj">
            <Attribute name="ContactMethodType"/>
            <Attribute name="ReferenceNumber"/>
        </Metadata>
        <Metadata name="TCRMOrganizationNameBObj">
            <Attribute name="NameUsageType"/>
            <Attribute name="OrganizationName"/>
        </Metadata>
        <Metadata name="TCRMPartyAddressBObj">
            <Attribute name="AddressId"/>
            <Attribute name="AddressUsageType"/>
            <Attribute name="CareOf"/>
```

FIG. 11A

```xml
        <Attribute name="EffectEndMonthDay"/>
        <Attribute name="EffectStartMonthDay"/>
        <Attribute name="EffectTimeEnd"/>
        <Attribute name="EffectTimeStart"/>
        <Attribute name="EndDate"/>
        <Attribute name="PreferredAddressIndicator"/>
        <Attribute name="SolicitationIndicator"/>
        <Attribute name="StartDate"/>
        <Attribute name="UndeliveredReasonType"/>
</Metadata>
<Metadata name="TCRMPartyBankAccountBObj">
        <Attribute name="AccountNumber"/>
        <Attribute name="AccountType"/>
        <Attribute name="BankNumber"/>
        <Attribute name="BranchNumber"/>
</Metadata>
<Metadata name="TCRMPartyChargeCardBObj">
        <Attribute name="CardNumber"/>
        <Attribute name="CardType"/>
</Metadata>
<Metadata name="TCRMPartyContactMethodBObj">
        <Attribute name="ContactMethodUsageType"/>
        <Attribute name="TCRMContactMethodBObj"/>
</Metadata>
<Metadata name="TCRMPartyIdentificationBObj">
        <Attribute name="IdentificationNumber"/>
        <Attribute name="IdentificationType"/>
</Metadata>
<Metadata name="TCRMPersonNameBObj">
        <Attribute name="GivenNameFour"/>
        <Attribute name="GivenNameOne"/>
        <Attribute name="GivenNameThree"/>
        <Attribute name="GivenNameTwo"/>
        <Attribute name="LastName"/>
        <Attribute name="NameUsageType"/>
        <Attribute name="PrefixType"/>
```

```xml
            <Attribute name="Suffix"/>
        </Metadata>
</MetadataCollection>

<Map source="VirtualPerson.map">
    <ObjectMap source="TCRMAdminContEquivBObj" target="MemHead">
        <AttributeMap source="AdminPartyId" target="memIdnum"/>
        <AttributeMap source="AdminSystemValue" target="srcCode"/>
    </ObjectMap>
    <ObjectMap source="TCRMPersonNameBObj" target="PERNAME">
        <AttributeMap source="LastName" target="lastname"/>
        <AttributeMap source="GivenNameOne" target="givenname1"/>
        <AttributeMap source="GivenNameTwo" target="givenname2"/>
        <AttributeMap source="GivenNameThree" target="givenname3"/>
        <AttributeMap source="Suffix" target="suffix"/>
        <AttributeMap source="StartDate" target="recStat"/>
        <AttributeMap source="EndDate" target="recStat"/>
        <AttributeMap source="NameUsageType" target="attrCode"/>
        <AttributeMap source="PrefixType" target="prefix"/>
        <AttributeMap source="GenerationType" target="generation"/>
    </ObjectMap>
    <ObjectMap source="TCRMPartyAddressBObj" target="PERADDR">
        <AttributeMap source="TCRMAddressBObj/AddressLineOne" target="addrline1"/>
        <AttributeMap source="TCRMAddressBObj/AddressLineTwo" target="addrline2"/>
        <AttributeMap source="TCRMAddressBObj/AddressLineThree" target="addrline3"/>
        <AttributeMap source="TCRMAddressBObj/ResidenceNumber" target="residencenum"/>
        <AttributeMap source="TCRMAddressBObj/City" target="city"/>
        <AttributeMap source="TCRMAddressBObj/ZipPostalCode" target="postalcode"/>
        <AttributeMap source="TCRMAddressBObj/LatitudeDegrees" target="latitude"/>
        <AttributeMap source="TCRMAddressBObj/LongitudeDegrees" target="longitude"/>
        <AttributeMap source="StartDate" target="recStat"/>
        <AttributeMap source="EndDate" target="recStat"/>
        <AttributeMap source="AddressUsageType" target="attrCode"/>
        <AttributeMap source="TCRMAddressBObj/ProvinceStateType" target="provstate"/>
        <AttributeMap source="TCRMAddressBObj/CountryType" target="country"/>
    </ObjectMap>
```

FIG. 11C

```xml
<ObjectMap source="TCRMPartyIdentificationBObj" target="PERIDENT">
    <AttributeMap source="IdentificationNumber" target="idnum"/>
    <AttributeMap source="IdentificationExpiryDate" target="expirydate"/>
    <AttributeMap source="StartDate" target="recStat"/>
    <AttributeMap source="EndDate" target="recStat"/>
    <AttributeMap source="IdentificationType" target="attrCode"/>
</ObjectMap>
<ObjectMap source="TCRMPartyContactMethodBObj" target="PERPHONE">
    <AttributeMap source="TCRMContactMethodBObj/ContactMethodType" target="1"/>
    <AttributeMap source="StartDate" target="recStat"/>
    <AttributeMap source="EndDate" target="recStat"/>
    <AttributeMap source="ContactMethodUsageType" target="attrCode"/>
    <AttributeMap source="TCRMContactMethodBObj/ReferenceNumber" target="phicc,pharea,refnum,phext"/>
</ObjectMap>
<ObjectMap source="TCRMPartyContactMethodBObj" target="PEREMAIL">
    <AttributeMap source="TCRMContactMethodBObj/ReferenceNumber" target="email"/>
    <AttributeMap source="TCRMContactMethodBObj/ContactMethodType" target="2"/>
    <AttributeMap source="StartDate" target="recStat"/>
    <AttributeMap source="EndDate" target="recStat"/>
    <AttributeMap source="ContactMethodUsageType" target="attrCode"/>
</ObjectMap>
<ObjectMap source="TCRMFinancialProfileBObj/TCRMPartyBankAccountBObj" target="PERBANK">
    <AttributeMap source="AccountNumber" target="acctnum"/>
    <AttributeMap source="BranchNumber" target="branchnum"/>
    <AttributeMap source="BankNumber" target="banknum"/>
    <AttributeMap source="StartDate" target="recStat"/>
    <AttributeMap source="EndDate" target="recStat"/>
    <AttributeMap source="AccountType" target="attrCode"/>
</ObjectMap>
<ObjectMap source="TCRMFinancialProfileBObj/TCRMPartyChargeCardBObj" target="PERBANKCARD">
    <AttributeMap source="CardNumber" target="cardnum"/>
    <AttributeMap source="CardExpiryDate" target="expirydate"/>
    <AttributeMap source="StartDate" target="recStat"/>
    <AttributeMap source="EndDate" target="recStat"/>
    <AttributeMap source="CardType" target="attrCode"/>
```

FIG. 11D

```
        </ObjectMap>
        <ObjectMap source="TCRMPersonBObj" target="PERGENDER">
            <AttributeMap source="GenderType" target="gender"/>
        </ObjectMap>
        <ObjectMap source="TCRMPersonBObj" target="PERDATE">
            <AttributeMap source="BirthDate" target="val"/>
        </ObjectMap>
        <ObjectMap source="TCRMPersonBObj" target="PERDATE">
            <AttributeMap source="DeceasedDate" target="val"/>
        </ObjectMap>
        <ObjectMap source="TCRMPersonBObj" target="PERMARITAL">
            <AttributeMap source="MaritalStatusType" target="maritalstatus"/>
        </ObjectMap>
        <ObjectMap source="TCRMPersonBObj" target="mdmper">
            <AttributeMap source="EntityId" target="entRecno"/>
            <AttributeMap source="PartyType" target="P"/>
        </ObjectMap>
    </Map>
</MetadataInput>
```

1200 transformed.businessKey.mdmper.xml
```xml
<?xml version="1.0" encoding="UTF-8"?>
<io:MetadataCollection xmlns:io="http://www.ibm.com/mdm/metadata"
xmlns:xs4xs="http://www.w3.org/2001/XMLSchema"
:xsi="http://www.w3.org/2001/XMLSchema-instance" type="BusinessKey">
    <Metadata name="MemHead">
        <Attribute name="memIdnum"/>
        <Attribute name="srcCode"/>
    </Metadata>
    <Metadata name="PERNAME">
        <Attribute name="lastname"/>
        <Attribute name="givenname1"/>
        <Attribute name="givenname2"/>
        <Attribute name="givenname3"/>
        <Attribute name="suffix"/>
        <Attribute name="attrCode"/>
        <Attribute name="prefix"/>
        <Attribute name=""/>
    </Metadata>
    <Metadata name="PERADDR">
        <Attribute name="addrline1"/>
        <Attribute name="addrline2"/>
        <Attribute name="addrline3"/>
        <Attribute name="city"/>
        <Attribute name="postalcode"/>
        <Attribute name="recStat"/>
        <Attribute name="attrCode"/>
        <Attribute name="provstate"/>
        <Attribute name="country"/>
    </Metadata>
    <Metadata name="PERIDENT">
        <Attribute name="idnum"/>
        <Attribute name="attrCode"/>
```

FIG. 12A

```
</Metadata>
<Metadata name="PERPHONE">
    <Attribute name="1"/>
    <Attribute name="attrCode"/>
    <Attribute name="phicc,pharea,refnum,phext"/>
</Metadata>
<Metadata name="PEREMAIL">
    <Attribute name="email"/>
    <Attribute name="2"/>
    <Attribute name="attrCode"/>
</Metadata>
<Metadata name="PERBANK">
    <Attribute name="acctnum"/>
    <Attribute name="branchnum"/>
    <Attribute name="banknum"/>
    <Attribute name="attrCode"/>
</Metadata>
<Metadata name="PERBANKCARD">
    <Attribute name="cardnum"/>
    <Attribute name="attrCode"/>
</Metadata>
<Metadata name="PERGENDER">
</Metadata>
<Metadata name="PERDATE">
</Metadata>
<Metadata name="PERMARITAL">
</Metadata>
<Metadata name="mdmper">
</Metadata>
</io:MetadataCollection>
```

```xml
input.inquiryLevel.mdmper.xml
<?xml version="1.0" encoding="UTF-8"?>
<MetadataInput xmlns:metadata="http://www.ibm.com/mdm/metadata"
xmlns:map="http://www.ibm.com/mdm/simplifiedMap"
xmlns:xsi="http://www.w3.org/2001/XMLSchema-instance"
xsi:noNamespaceSchemaLocation="MetadataTransformationInput.xsd">

<MetadataCollection type="InquiryLevel" description="Person/1">
        <Metadata name="TCRMPersonNameBObj"/>
        <Metadata name="TCRMFinancialProfileBObj"/>
        <Metadata name="TCRMIncomeSourceBObj"/>
        <Metadata name="TCRMPartyChargeCardBObj"/>
        <Metadata name="TCRMPartyBankAccountBObj"/>
        <Metadata name="TCRMPartyAddressBObj"/>
        <Metadata name="TCRMPartyPayrollDeductionBObj"/>
        <Metadata name="TCRMPartyLobRelationshipBObj"/>
        <Metadata name="TCRMDefaultPrivPrefBObj"/>
        <Metadata name="TCRMPartyIdentificationBObj"/>
        <Metadata name="TCRMPartyValueBObj"/>
        <Metadata name="TCRMPartyPrivPrefBObj"/>
        <Metadata name="TCRMPartyContactMethodBObj"/>
        <Metadata name="TCRMPartyRelationshipBObj"/>
        <Metadata name="TCRMPersonBObj"/>
        <Metadata name="TCRMAdminContEquivBObj"/>
    </MetadataCollection>

<Map source="VirtualPerson.map">
        <ObjectMap source="TCRMAdminContEquivBObj" target="MemHead">
            <AttributeMap source="AdminPartyId" target="memidnum"/>
            <AttributeMap source="AdminSystemValue" target="srcCode"/>
        </ObjectMap>
        <ObjectMap source="TCRMPersonNameBObj" target="PERNAME">
            <AttributeMap source="LastName" target="lastname"/>
            <AttributeMap source="GivenNameOne" target="givenname1"/>
            <AttributeMap source="GivenNameTwo" target="givenname2"/>
            <AttributeMap source="GivenNameThree" target="givenname3"/>
            <AttributeMap source="Suffix" target="suffix"/>
```

```
        <AttributeMap source="StartDate" target="recStat"/>
        <AttributeMap source="EndDate" target="recStat"/>
        <AttributeMap source="NameUsageType" target="attrCode"/>
        <AttributeMap source="PrefixType" target="prefix"/>
        <AttributeMap source="GenerationType" target="generation"/>
</ObjectMap>
<ObjectMap source="TCRMPartyAddressBObj" target="PERADDR">
        <AttributeMap source="TCRMAddressBObj/AddressLineOne" target="addrline1"/>
        <AttributeMap source="TCRMAddressBObj/AddressLineTwo" target="addrline2"/>
        <AttributeMap source="TCRMAddressBObj/AddressLineThree" target="addrline3"/>
        <AttributeMap source="TCRMAddressBObj/ResidenceNumber" target="residencenum"/>
        <AttributeMap source="TCRMAddressBObj/City" target="city"/>
        <AttributeMap source="TCRMAddressBObj/ZipPostalCode" target="postalcode"/>
        <AttributeMap source="TCRMAddressBObj/LatitudeDegrees" target="latitude"/>
        <AttributeMap source="TCRMAddressBObj/LongitudeDegrees" target="longitude"/>
        <AttributeMap source="StartDate" target="recStat"/>
        <AttributeMap source="EndDate" target="recStat"/>
        <AttributeMap source="AddressUsageType" target="attrCode"/>
        <AttributeMap source="TCRMAddressBObj/ProvinceStateType" target="provstate"/>
        <AttributeMap source="TCRMAddressBObj/CountryType" target="country"/>
</ObjectMap>
<ObjectMap source="TCRMPartyIdentificationBObj" target="PERIDENT">
        <AttributeMap source="IdentificationNumber" target="idnum"/>
        <AttributeMap source="IdentificationExpiryDate" target="expirydate"/>
        <AttributeMap source="StartDate" target="recStat"/>
        <AttributeMap source="EndDate" target="recStat"/>
        <AttributeMap source="IdentificationType" target="attrCode"/>
</ObjectMap>
<ObjectMap source="TCRMPartyContactMethodBObj" target="PERPHONE">
        <AttributeMap source="TCRMContactMethodBObj/ContactMethodType" target="1"/>
        <AttributeMap source="StartDate" target="recStat"/>
        <AttributeMap source="EndDate" target="recStat"/>
        <AttributeMap source="ContactMethodUsageType" target="attrCode"/>
        <AttributeMap source="TCRMContactMethodBObj/ReferenceNumber"
        target="phicc,pharea,refnum,phext"/>
```

FIG. 13B

```
</ObjectMap>
<ObjectMap source="TCRMPartyContactMethodBObj" target="PEREMAIL">
    <AttributeMap source="TCRMContactMethodBObj
        /ReferenceNumber" target="email"/>
    <AttributeMap source="TCRMContactMethodBObj
        /ContactMethodType" target="2"/>
    <AttributeMap source="StartDate" target="recStat"/>
    <AttributeMap source="EndDate" target="recStat"/>
    <AttributeMap source="ContactMethodUsageType" target="attrCode"/>
</ObjectMap>
<ObjectMap source="TCRMFinancialProfileBObj
        /TCRMPartyBankAccountBObj" target="PERBANK">
    <AttributeMap source="AccountNumber" target="acctnum"/>
    <AttributeMap source="BranchNumber" target="branchnum"/>
    <AttributeMap source="BankNumber" target="banknum"/>
    <AttributeMap source="StartDate" target="recStat"/>
    <AttributeMap source="EndDate" target="recStat"/>
    <AttributeMap source="AccountType" target="attrCode"/>
</ObjectMap>
<ObjectMap source="TCRMFinancialProfileBObj
        /TCRMPartyChargeCardBObj" target="PERBANKCARD">
    <AttributeMap source="CardNumber" target="cardnum"/>
    <AttributeMap source="CardExpiryDate" target="expirydate"/>
    <AttributeMap source="StartDate" target="recStat"/>
    <AttributeMap source="EndDate" target="recStat"/>
    <AttributeMap source="CardType" target="attrCode"/>
</ObjectMap>
<ObjectMap source="TCRMPersonBObj" target="PERGENDER">
    <AttributeMap source="GenderType" target="gender"/>
</ObjectMap>
<ObjectMap source="TCRMPersonBObj" target="PERDATE">
    <AttributeMap source="BirthDate" target="val"/>
</ObjectMap>
<ObjectMap source="TCRMPersonBObj" target="PERDATE">
    <AttributeMap source="DeceasedDate" target="val"/>
```

FIG. 13C

```
        </ObjectMap>
        <ObjectMap source="TCRMPersonBObj" target="PERMARITAL">
            <AttributeMap source="MaritalStatusType" target="maritalstatus"/>
        </ObjectMap>
        <ObjectMap source="TCRMPersonBObj" target="mdmper">
            <AttributeMap source="EntityId" target="entRecno"/>
            <AttributeMap source="PartyType" target="P"/>
        </ObjectMap>
    </Map>
</MetadataInput>
```

1330

FIG. 13D transformed.inquiryLevel.mdmper.xml
```xml
<?xml version="1.0" encoding="UTF-8"?>
<io:MetadataCollection xmlns:io="http://www.ibm.com/mdm/metadata" xmlns:xs4xs="http://www.w3.org/2001/XMLSchema"
:xsi="http://www.w3.org/2001/XMLSchema-instance" type="InquiryLevel">
        <Metadata name="MemHead">
        </Metadata>
        <Metadata name="PERNAME">
        </Metadata>
        <Metadata name="PERADDR">
        </Metadata>
        <Metadata name="PERIDENT">
        </Metadata>
        <Metadata name="PERPHONE">
        </Metadata>
        <Metadata name="PEREMAIL">
        </Metadata>
        <Metadata name="PERBANK">
        </Metadata>
        <Metadata name="PERBANKCARD">
        </Metadata>
        <Metadata name="PERGENDER">
        </Metadata>
        <Metadata name="PERDATE">
        </Metadata>
        <Metadata name="PERMARITAL">
        </Metadata>
        <Metadata name="mdmper">
        </Metadata>
</io:MetadataCollection>
```

FIG. 14

DYNAMIC ASSIGNMENT OF BUSINESS LOGIC BASED ON SCHEMA MAPPING METADATA

FIELD

Embodiments of the invention relate to dynamic assignment of business logic based on schema mapping metadata.

BACKGROUND

When applications are being integrated that use different data structures, a schema mapping is used to transform the data from a source system to a target system. A schema mapping is a declarative specification of the relationship between a source schema of the source system and a target schema of the target system. An eXtensible Markup Language (XML) map is used to transform an XML document, compliant to the source schema, into another XML document, compliant to the target schema.

Different schemas may be used within the context of a single application, such as a solution in which data stored for the purpose of searching/matching is in a format that lends itself to high performance processing (e.g., denormalized, bucketed/hashed), whereas the same information may be stored in normalized structures to facilitate management through Service Oriented Architecture (SOA) services leveraged by client applications.

Mapping and translation technologies exist today that allow for correlating and generating structural transformations between objects having different structures. As data structures change, the mapping between the objects change and new transforms are generated.

However in addition to the structural mapping, applications generally require contextual values to facilitate processing of the data, for example, invoking a SOA service. These contextual values may be affiliated with the user's settings, the system configuration, or data processing configuration, etc., all of which may be related to the structure of the data itself, but managed independently by the source system and the target system. These contextual data may or may not be shared between the applications being integrated.

SUMMARY

Provided is a method for dynamic assignment of business logic based on schema mapping metadata. A first transformation is performed, with a processor, using a simplified map and a structural transformation map that maps attributes between a source system and a target system to generate simplified map data that includes source attribute and target attribute pairs. A document that includes combined data is generated using the simplified map data and source system metadata containing contextual values of the source system. A second transformation is performed to generate transformed contextual metadata containing contextual values for the target system using a contextual metadata transformation map and the combined data.

Provided is a computer program product for dynamic assignment of business logic based on schema mapping metadata. The computer program product comprises a computer readable storage medium having program code embodied therewith, the program code executable by at least one processor to: perform a first transformation using a simplified map and a structural transformation map that maps attributes between a source system and a target system to generate simplified map data that includes source attribute and target attribute pairs; generate a document that includes combined data using the simplified map data and source system metadata containing contextual values of the source system; and perform a second transformation to generate transformed contextual metadata containing contextual values for the target system using a contextual metadata transformation map and the combined data.

Provided is a computer system for dynamic assignment of business logic based on schema mapping metadata. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to: perform a first transformation using a simplified map and a structural transformation map that maps attributes between a source system and a target system to generate simplified map data that includes source attribute and target attribute pairs; generate a document that includes combined data using the simplified map data and source system metadata containing contextual values of the source system; and perform a second transformation to generate transformed contextual metadata containing contextual values for the target system using a contextual metadata transformation map and the combined data.

BRIEF DESCRIPTION OF THE SEVERAL VIEWS OF THE DRAWINGS

Referring now to the drawings in which like reference numbers represent corresponding parts throughout:

FIG. 6 illustrates an example structural transformation map in accordance with certain embodiments. FIG. 6 is formed by FIGS. 6A, 6B, 6C, 6D, 6E, 6F, 6G, 6H, 6I, 6J, 6K, 6L, and 6M.

FIG. 7 illustrates an example simplified map in accordance with certain embodiments. FIG. 7 is formed by FIGS. 7A, 7B, 7C, and 7D.

FIG. 8 illustrates an example of a SimplifiedMap.xsd in accordance with certain embodiments.

FIG. 9 illustrates an example of a Metadata.xsd in accordance with certain embodiments.

FIG. 10 illustrates an example of a MetadataTransformationInput.xsd in accordance with certain embodiments.

FIG. 11 illustrates an example of an input business key in XML format in accordance with certain embodiments. FIG. 11 is formed by FIGS. 11A, 11B, 11C, 11D, and 11E.

FIG. 12 illustrates an example of a transformed business key in XML format in accordance with certain embodiments. FIG. 12 is formed by FIGS. 12A and 12B.

FIG. 13 illustrates an example of an inquiry level mapping in accordance with certain embodiments. FIG. 13 is formed by FIGS. 13A, 13B, 13C, and 13D.

FIG. 14 illustrates an example of transformed inquiry level metadata in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
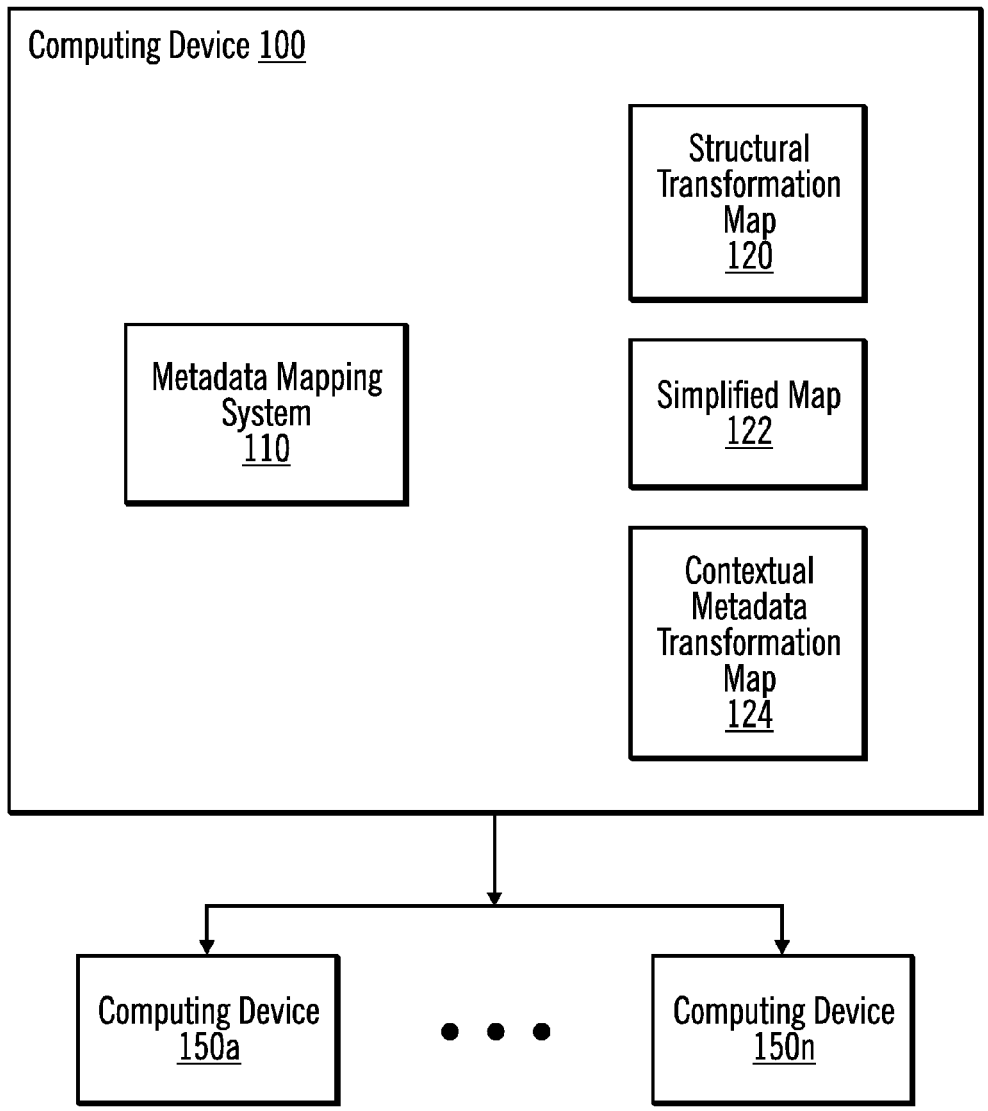
FIG. 1 illustrates a computing environment in accordance with certain embodiments.

FIG. 1 illustrates a computing environment in accordance with certain embodiments. A computing device 100 includes a metadata mapping system 110, a structural transformation map 120 (e.g., a source schema to target schema map), a simplified map 122, and a contextual metadata transformation map 124. The computing device 100 is coupled to other computing devices 150a . . . 150n (where the ellipses indicate that there may be additional computing devices).

The metadata mapping system 110 provides an automatic approach to derive contextual values for a target system that shares similar contextual values with a source system. Once the structural mappings between the source and target is established, the metadata mapping system 110 implements additional mappings to create transformations for each type of contextual value. In certain embodiments, as the structural mapping is changed, the metadata mapping system 110 changes the contextual mappings. In certain embodiments, in response to determining that contextual values at the source system have changed, the metadata mapping system 110 perform the transformations to generate changed, transformed contextual metadata (e.g., to generate the contextual values for the source system).

For example, a source person data type with first name, last name, dateOfBirth, social security number, and residence attributes may be mapped to a target PERSON data type with NAME, AGE, SOCIALSECURITYNUMBER and HOMEADDRESS attributes.

In this example, the metadata mapping system 110 derives contextual values from the source system to generate transformed contextual metadata containing contextual values for the target system using transformations (e.g., schema mapping):

1) Visibility criteria (user-dependent context): The AGE of a certain PERSON instance is not supposed to be visible to the current session as the current session has no visibility on dateOfBirth of such source 'person' instance.

2) Uniqueness criteria (system-wide context): The SOCIALSECURITYNUMBER, if available, should be used to uniquely identify an instance of PERSON in the target system. If SOCIALSECURITYNUMBER is not available, then the combination of NAME, AGE, and HOMEADDRESS uniquely identify a PERSON instance.

Figure 2:
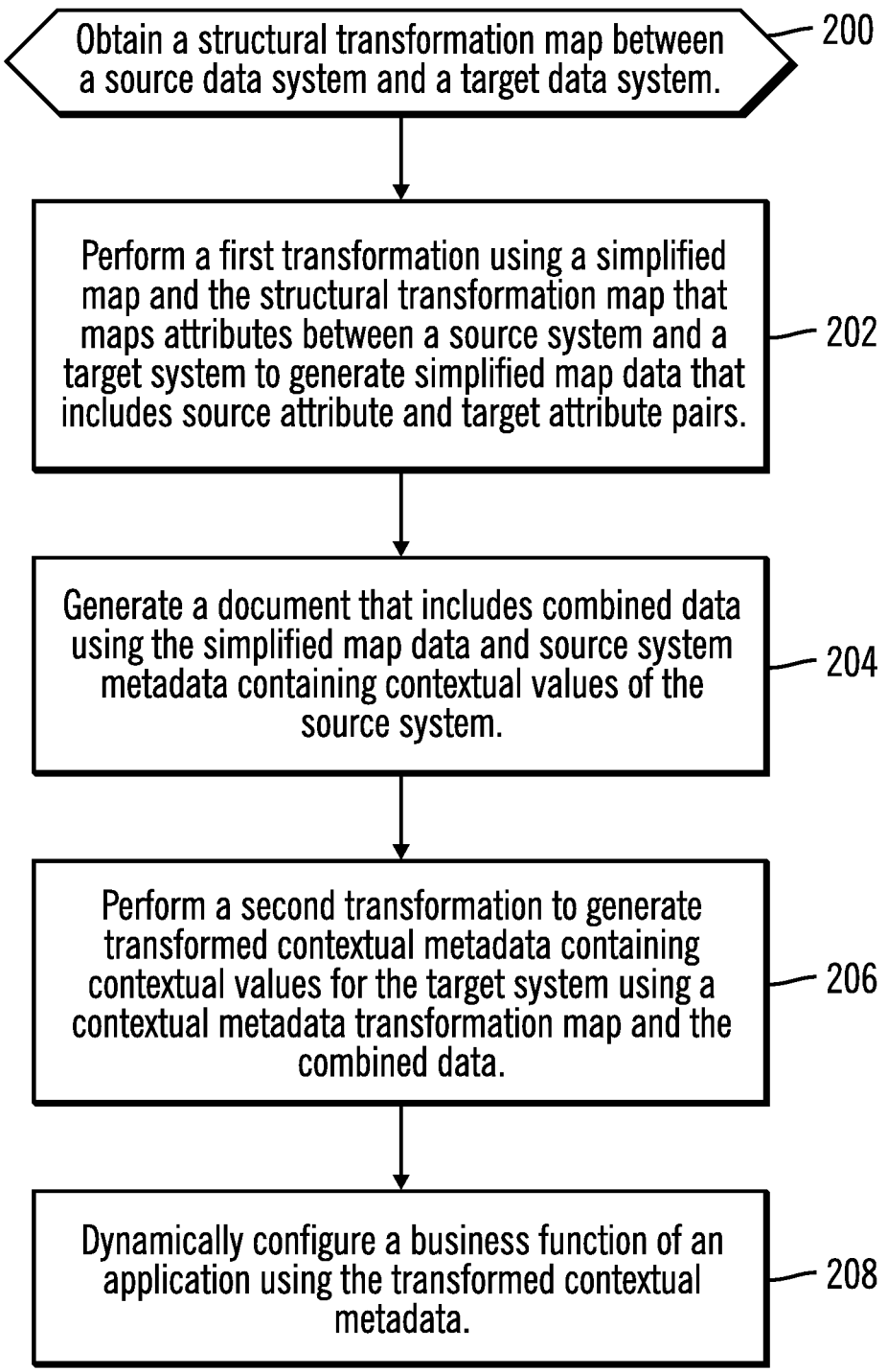
FIG. 2 illustrates, in a flow diagram, operations for dynamic assignment of business logic based on schema mapping metadata in accordance with certain embodiments.

FIG. 2 illustrates, in a flow diagram, operations for dynamic assignment of business logic based on schema mapping metadata in accordance with certain embodiments. Control begins at block 200 with the metadata mapping system 110 obtaining a structural transformation map between a source system and a target system. In certain embodiments, the structural transformation may include source attribute and target attribute pairs, in addition to other information used to map data from the source system to the target system. In certain embodiments, the metadata mapping system 110 defines the structural transformation map. In block 202, the metadata mapping system 110 generates simplified map data using the structural transformation map (e.g., by sending the structural transformation map through a map simplifier, wherein the map simplifier transforms the structural transformation map into a simpler data structure). In certain embodiments, the simplified map data is an XML file (that is based on an XML schema definition: SimplifiedMap.xsd) that is easier to understand than the transformation map. In certain embodiments, the simplified map data includes source attribute and target attribute pairs, without including other data contained in the transformation map.

In block 204, the metadata mapping system 110 generates a document that includes combined data (e.g., as a new data structure) using the simplified map data and source system metadata, where the combined data conforms to a metadata transform input schema definition. In certain embodiments, the metadata transform input schema definition is generated from a structural transformation map schema definition and a generic metadata schema definition. In certain embodiments, the source system metadata is static data or dynamically retrieved data. A generic metadata schema definition may be described as a structure that provides a generic mechanism for defining data supporting application business functions of various types. In block 206, the metadata mapping system 110 generates transformed contextual metadata using a contextual metadata transformation map and the combined data.

In block 208, the metadata mapping system 110 dynamically configures a business function of an application using the transformed contextual metadata.

Thus, the metadata mapping system 110 derives from a structural map file a dynamic structure and mechanism for transforming the contextual values between the source and target applications so that application functionality may be shared at runtime.

XML Schema Definition (XSD) may be described as a description of a type of XML document.

In certain embodiments, the metadata mapping system 110:

(1) creates two schemas: a simplified map schema (e.g., SimplifiedMap.xsd) and a contextual mapping schema (e.g., MetadataTransformationInput.xsd);

(2) creates a transformation to convert a structural map file into a new format compliant to the simplified map schema;

(3) creates a transformation to convert the combination of the source's contextual value collection (e.g., MetadataCollection) and the simplified map into a target contextual value collection (e.g., MetadataCollection); and (4) implements one or more data collector components to collect the contextual values within the source system from an input file, a live database, etc.

In certain embodiments, the metadata mapping system 110 creates the mapping between object structures, leverages the resulting map artifact created from object structure schemas to define a simplified schema, and assigns simplified schema elements (map) to metadata driving configurations related to either input schema. Configurations may be represented as XML file input, database records, etc. At system start-up, the metadata mapping system 110 may load the configuration, generate the appropriate transforms, and cache them for application use at runtime.

In addition, the metadata mapping system 110 implements a mechanism for refreshing cached contextual values. Thus, if the contextual values change while the system is up, the metadata mapping system 110 reruns the transform and re-caches the changed contextual values.

In this manner, the metadata mapping system 110 simplifies managing contextual values between systems where the contextual values are to be shared but is not based on data structure alone. In certain embodiments, the metadata mapping system 110 allows for removal of redundant context between systems (e.g., where there is overlap).

In certain embodiments, the metadata mapping system 110 uses one structural mapping, instead of maintaining and correlating all structural and contextual mappings.

Figure 3:
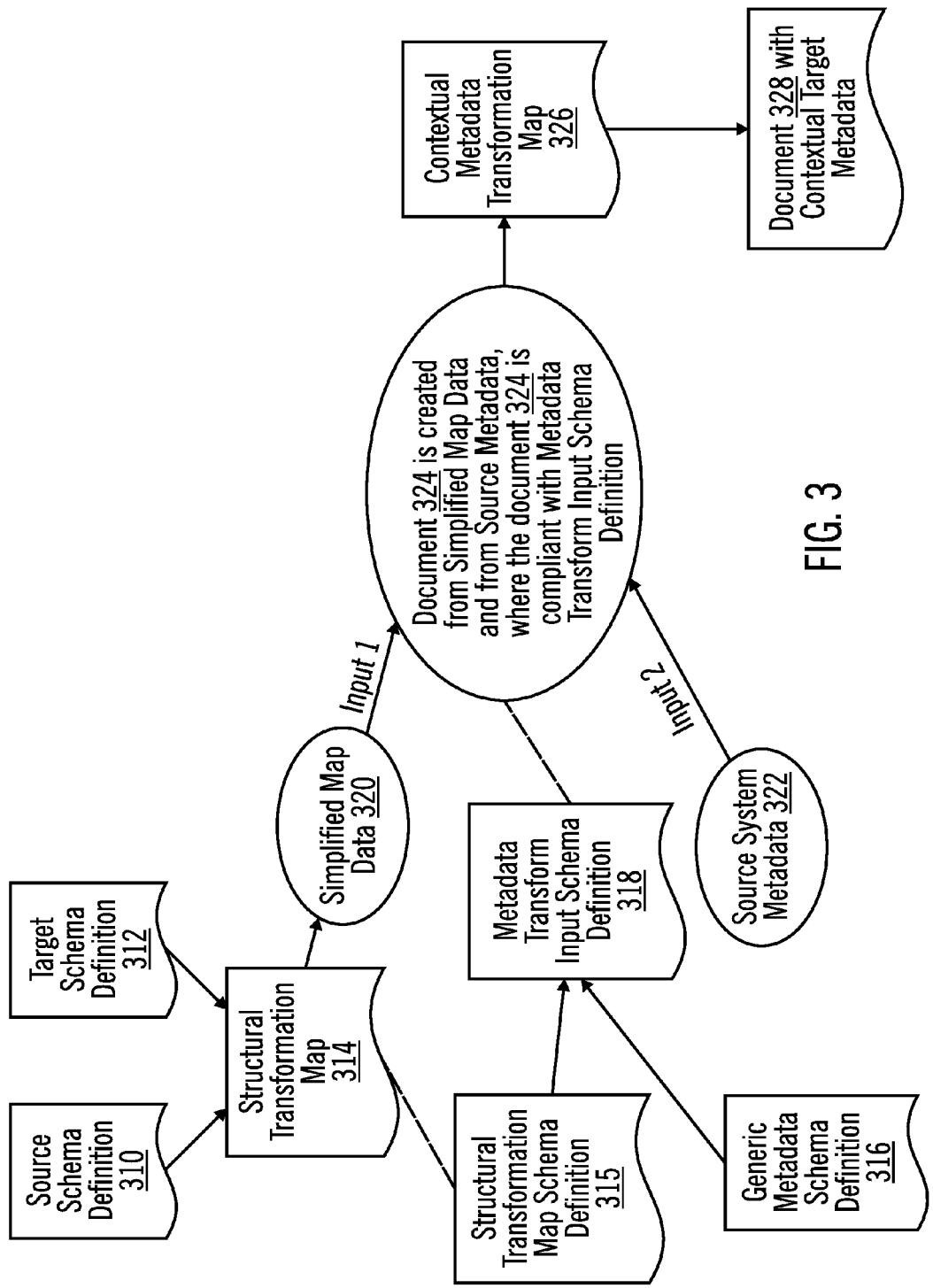
FIG. 3 illustrates processing for contextual metadata transformations in accordance with certain embodiments.

FIG. 3 illustrates creation of a document contextual metadata transformations in accordance with certain embodiments. A source schema definition 310 and a target schema definition 312 are used to generate a structural transformation map 314. The structural transformation map 314 is used to generate simplified map data 320. In addition, the structural transformation map 314 has an associated structural transformation map schema definition 315. The structural transformation map schema definition 315 and a generic metadata schema definition 316 are used generate a metadata transform input schema definition 318. A document 324 is created from the simplified map data 320 and from source system metadata 322, where the document 310 is compliant with the metadata transform input schema definition. The source system metadata 322 may be collected by one or more data collectors from one or more sources. This document 324 is processed using the metadata transform map 326 to output a document 328 with contextual target metadata.

The metadata mapping system 110 eliminates the need for additional metadata mapping and transformations when the source to target mapping changes. In certain embodiments, the metadata mapping system 110 uses a single source-to-target structural transformation map along with a generic metadata schema definition to derive metadata equivalents for the target application. Two examples include metadata to support metadata-driven service inquiry levels and metadata driven business keys that define the uniqueness of a particular business object.

Figure 4:
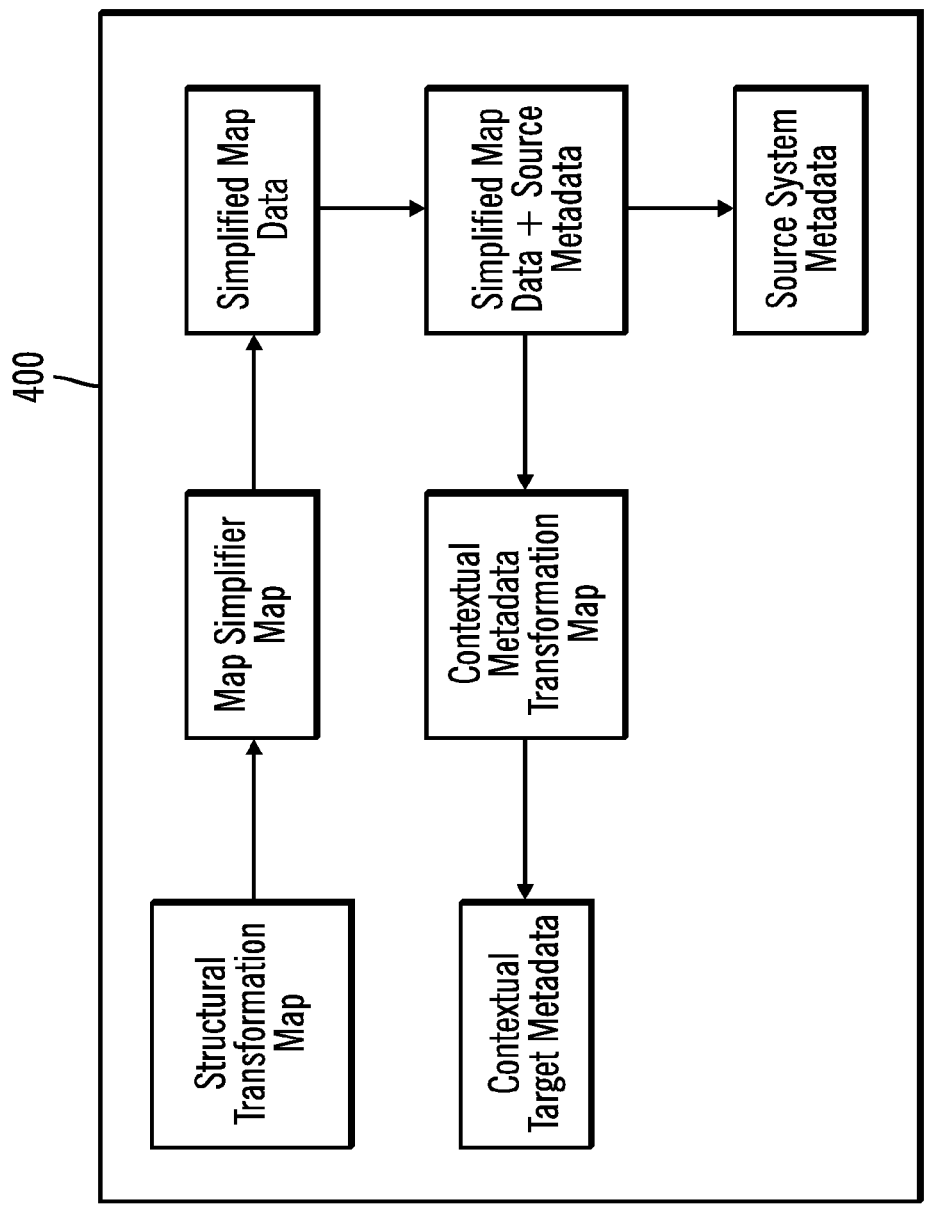
FIG. 4 illustrates work flow of a contextual metadata transformation in accordance with certain embodiments.

FIG. 4 illustrates work flow 400 of a contextual metadata transformation in accordance with certain embodiments. With embodiments, a user (e.g., a developer) defines custom transformations from a source schema to a target schema in a structural transformation map. The metadata mapping system 110 promotes this capability to automatically realize transforming the metadata of a source system to a target system or vice versa. In certain embodiments, the metadata mapping system 110 takes the structural transformation map as an input to a new transformation, named "map simplifier" in the metadata mapping system 110. The "map simplifier" transforms the structural transformation map into a simplified map (e.g., in XML format). Then, the metadata mapping system 110 uses this simplified map and the source system metadata to form a new structure that is passed on as input to a third transform using a contextual metadata transformation map to produce the contextual target metadata (e.g., contextual values to be applied on the target system).

Figure 5:
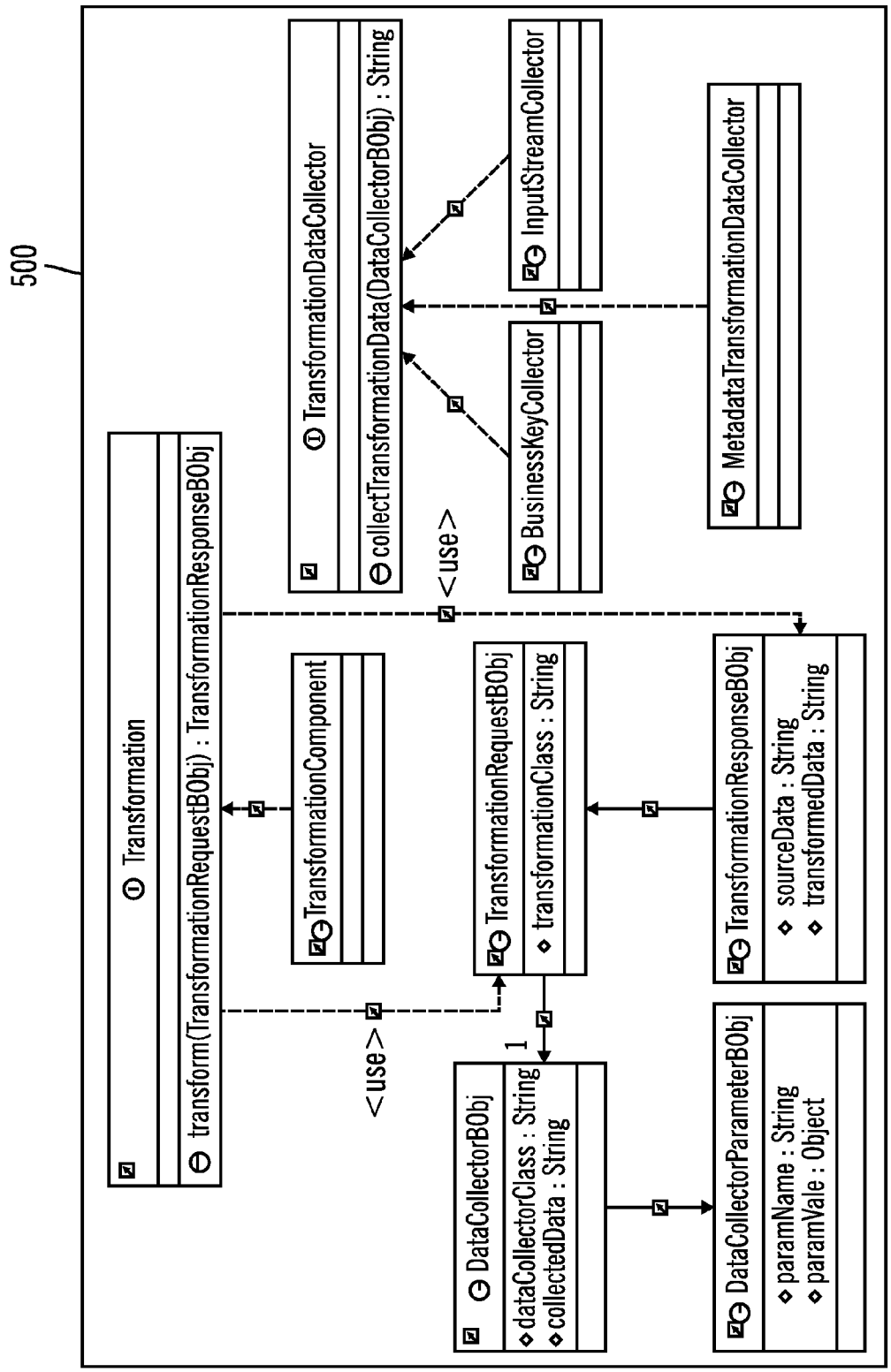
FIG. 5 illustrates class diagrams in accordance with certain embodiments.

FIG. 5 illustrates class diagrams 500 in accordance with certain embodiments. In certain embodiments, the class diagrams 500 represent the interfaces and logic for the transformations performed by the metadata mapping system 110.

As an example, consider the business key transformation (as a special case of metadata transformation). The business key is the designation of one or more attributes of the objects such that it makes the object unique among the whole data set (e.g., the combination of first name last name and initial could make a person's name unique, or address line one, city, country and zip code together could define the uniqueness of an address).

In this example, the structural transformation map (e.g., the source to target map) is defined to transform a MemRowList object (holding a list of MemRow objects) to TCRMPersonBObj object, where TCRMPersonBObj contains multiple child objects, and each of those child objects have certain business keys. The metadata mapping system 110 allows transformation of the business key information in the target model and generates similar insight regarding the attributes of the source MemRow objects.

In certain embodiments, the metadata mapping system 110 makes an instance of TransformationComponent class and invokes its transform ( ) method by supplying a TransformationRequestBObj object as its parameter. "MetadataTransformation" is the supplied transformationClass attribute of the input TransformationRequestBObj. The input object is also supplied with a single DataCollectorBObj object. This DataCollectorBObj object identifies the logic to collect and construct the input XML for the "MetadataTransformation" map. Its collector component is coded to read the simplified map and the business key information (for the objects participated in the simplified map) and construct the input XML for the MetadataTransformation map. The output object of TransformationComponent.transform( ) is an instance of TransformationResponseBObj. This object brings back the collected source data XML as well as its transformed data XML.

The example of defining the uniqueness of an address by configuring a business key definition is one example of a business function that leverages transformed contextual metadata. For example, the full structural mapping of an address may contain many fields mapped between its source and target representations as in Table 1 and Table 2:

TABLE 1

| PERADDR | TCRMPartyAdressBObj.TCRMAAddressBObj |
|---|---|
| addrline1 | AddressLineOne |
| addrline2 | AddressLineTwo |
| addrline3 | AddressLineThree |
| residencenum | ResidenceNumber |
| city | City |
| provstate | ProvinceStateValue |
| . . . | . . . |

TABLE 2

| Virtual MDM Attribute Type, Field Name, and Attribute Code | Physical MDM Business Object and Element Name |
|---|---|
| Postal code | ZipPostalCode |
| Country | CountryValue |
| Latitude | LatitudeDegrees |

TABLE 2-continued

| Virtual MDM Attribute Type, Field Name, and Attribute Code | Physical MDM Business Object and Element Name |
|---|---|
| Longitude | LongitudeDegrees |
| ... | ... |

Continuing with the example, the business key defined for the Party Address, with fields that qualify an address as being unique/different from another, may be a subset of the total number of fields. The configuration of how these fields are defined outside of this structural mapping in the source or target application (e.g., may be properties file, may be a database, etc.) may be stored in another table.

The subset of fields defining the business key may be AddressLineOne, City, ProvinceStateValue, and ZipPostalCode. Using this subset of information drives the maintenance or processing of addresses in the target system. For example, if the business keys are the same, any remaining fields that have changed may be updated. If the business keys are different from any address existing in the target system, a new address may be added to the target system.

FIG. 6 illustrates an example structural transformation map 600, 605, 610, 615, 620, 625, 630, 635, 640, 645, 650, 655, 660 in accordance with certain embodiments. FIG. 6 is formed by FIGS. 6A, 6B, 6C, 6D, 6E, 6F, 6G, 6H, 6I, 6J, 6K, 6L, and 6M. In FIG. 6, the structural transformation map is labeled "VirtualPerson.map", and a user may change this structural transformation map to suit business or other requirements.

FIG. 7 illustrates an example simplified map 700, 710, 720, 730 in accordance with certain embodiments. FIG. 7 is formed by FIGS. 7A, 7B, 7C, and 7D. In FIG. 7, the simplified map 700, 710, 720, 730 is a simplified version of the structural transformation map (FIG. 6) in XML format and labeled "simplified.virtualPerson.map.xml".

In certain embodiments, the structural transformation map is an XML document and has an operation-centric structure. The simplified map may be an XML document, compliant with a simplifiedMap.xsd and has an attribute-centric structure. A simplified map may contain a single "Map" root element with multiple "ObjectMap" elements representing the mapped objects in either integrated system. Each "ObjectMap" also contains multiple "AttributeMap" elements representing the attribute-level mapping between the two integrated systems.

FIG. 8 illustrates an example of a SimplifiedMap.xsd 800 in accordance with certain embodiments. The SimplifiedMap.xsd represents the XML schema definition for the simplified map 700, 710, 720, 730 (FIG. 7).

FIG. 9 illustrates an example of a Metadata.xsd 900 in accordance with certain embodiments. The Metadata.xsd 900 is an example of a generic metadata schema definition. The Metadata.xsd 900 represents the XML schema definition for the metadata that both source and target systems share.

FIG. 10 illustrates an example of a MetadataTransformationInput.xsd 1000 in accordance with certain embodiments. The MetadataTransformationInput.xsd 1000 represents the XML schema definition for the input object of the metadata transformation. The MetadataTransformationInput.xsd 1000 imports SimplifiedMap.xsd 800 and Metadata.xsd 900.

FIG. 11 illustrates an example of an input business key 1100, 1110, 1120, 1130, 1140 in XML format in accordance with certain embodiments. FIG. 11 is formed by FIGS. 11A, 11B, 11C, 11D, and 11E. That is, the input business key is an input object for contextual transformation. The input business key 1100, 1110, 1120, 1130, 1140 is in XML and is labeled "input.businessKey.mdmper.xml". The value object representing this input business key 1100 is dynamically constructed by the source system and then is passed to the contextual metadata transformation map in order to result in similar business key information for the target system. An XML representation of the transformed business key metadata is provided in "transformed.businessKey.mdmper.xml" file.

FIG. 12 illustrates an example of a transformed business key 1200, 1210 in XML format in accordance with certain embodiments. FIG. 12 is formed by FIGS. 12A and 12B. The transformed business key 1200, 1210 has been transformed by the contextual metadata transformation map.

FIG. 13 illustrates an example of an inquiry level mapping 1300, 1310, 1320, 1340 in accordance with certain embodiments. FIG. 13 is formed by FIGS. 13A, 13B, 13C, and 13D. The inquiry level mapping is in XML and is labeled as "input.inquiryLevel.mdmper.xml". The value object representing this input XML is dynamically constructed by the source system and then is passed to the contextual metadata transformation map in order to result in similar inquiry level information for the target system.

FIG. 14 illustrates an example of transformed inquiry level metadata 1400 in accordance with certain embodiments. The transformed inquiry level metadata is in XML and is labeled "transformed.inquiryLevel.mdmper.xml". The transformed inquiry level metadata 1400 has been transformed by the contextual metadata transformation map.

In certain embodiments, the metadata mapping system 110 indicates, as part of a translation, how the information should get used (e.g., look-ups, part of business key/uniqueness processing). In addition, as usage patterns change, the metadata mapping system 110 provides a dynamic technique of leveraging new configurations to replace the old.

The metadata mapping system 110 leverages structural mapping to drive the dynamic configuration/management of business function of an application. The metadata mapping system 110 uses a structural transformation map to further drive the dynamic derivation of application metadata from either a source schema or a target schema.

The metadata mapping system 110 uses a derived schema from an existing structural transformation map is to generate other inputs (e.g., a database, a file, etc.) when configurations change to reconfigure metadata transform cache.

The metadata mapping system 110 utilizes and exploits new or changed portions of the schema definition through a derived schema detected during schema translation processing.

In certain embodiments, a user defines the structural transformation map between source and target schemas at design time, then, the compiled transform from this structural transformation map is deployed to for use at runtime. In certain embodiments, the contextual metadata transformation automatically becomes available, and the user does not need to introduce other design-time mapping activities or duplication of metadata between the source and target systems.

The user may define application configurations for business logic behavior (e.g., contextual values) in a database or a properties files to be leveraged by the metadata mapping system 110 at runtime. The metadata mapping system 110 picks up dynamic changes to such application configurations and makes them operational in the runtime. At application initialization, the structural transformation map is obtained, and the appropriate data collectors provide a representation of the source system metadata (e.g., source system contextual values). The metadata mapping system 110 automatically transforms and stores in memory a representation of the metadata (e.g., contextual values) keyed in such a way that both the source system and the target system can leverage the representation at runtime.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
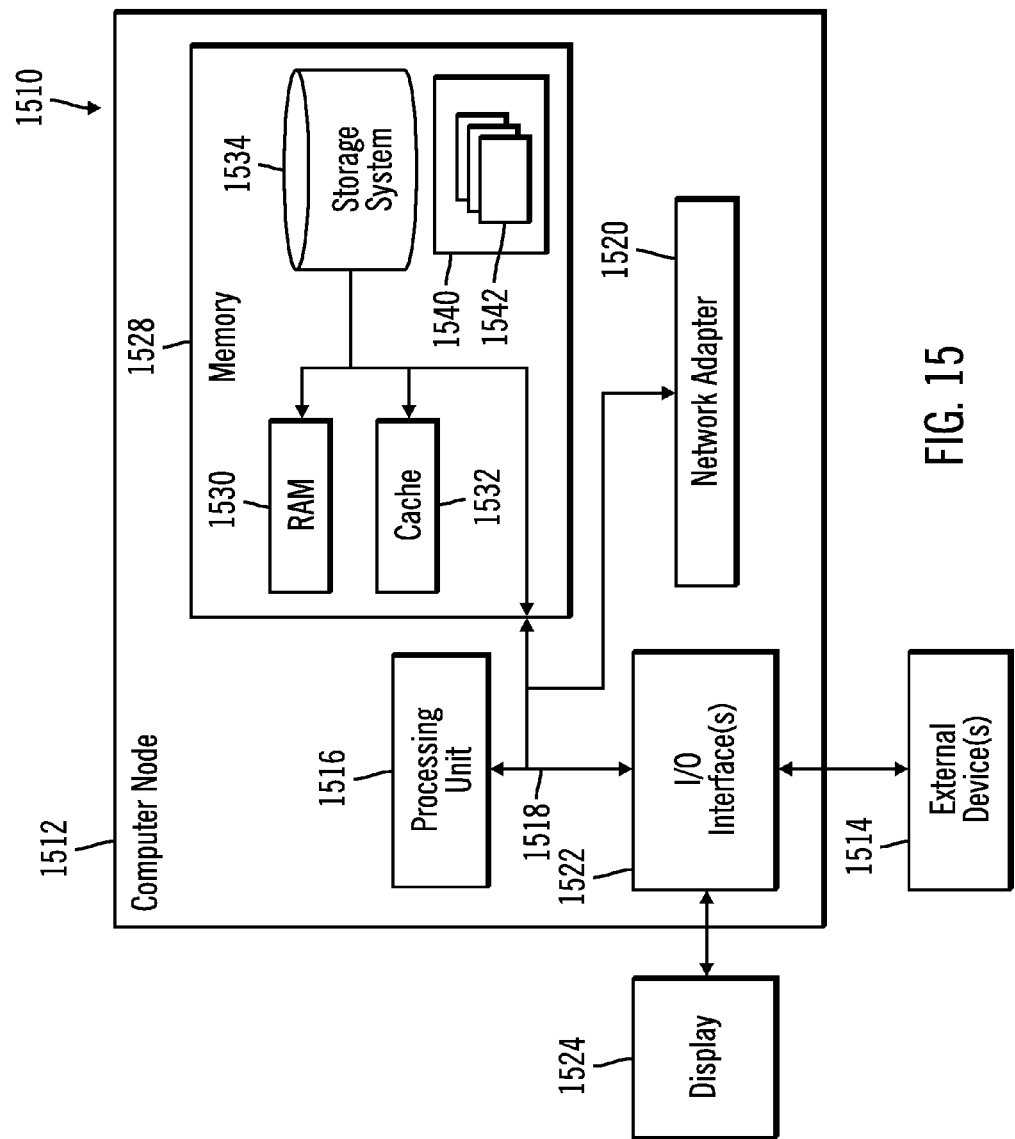
FIG. 15 illustrates a cloud computing node in accordance with certain embodiments.

Referring now to FIG. 15, a schematic of an example of a cloud computing node is shown. Cloud computing node 1510 is only one example of a suitable cloud computing node and is not intended to suggest any limitation as to the scope of use or functionality of embodiments of the invention described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 in cloud computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to a processor or processing unit 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Figure 16:
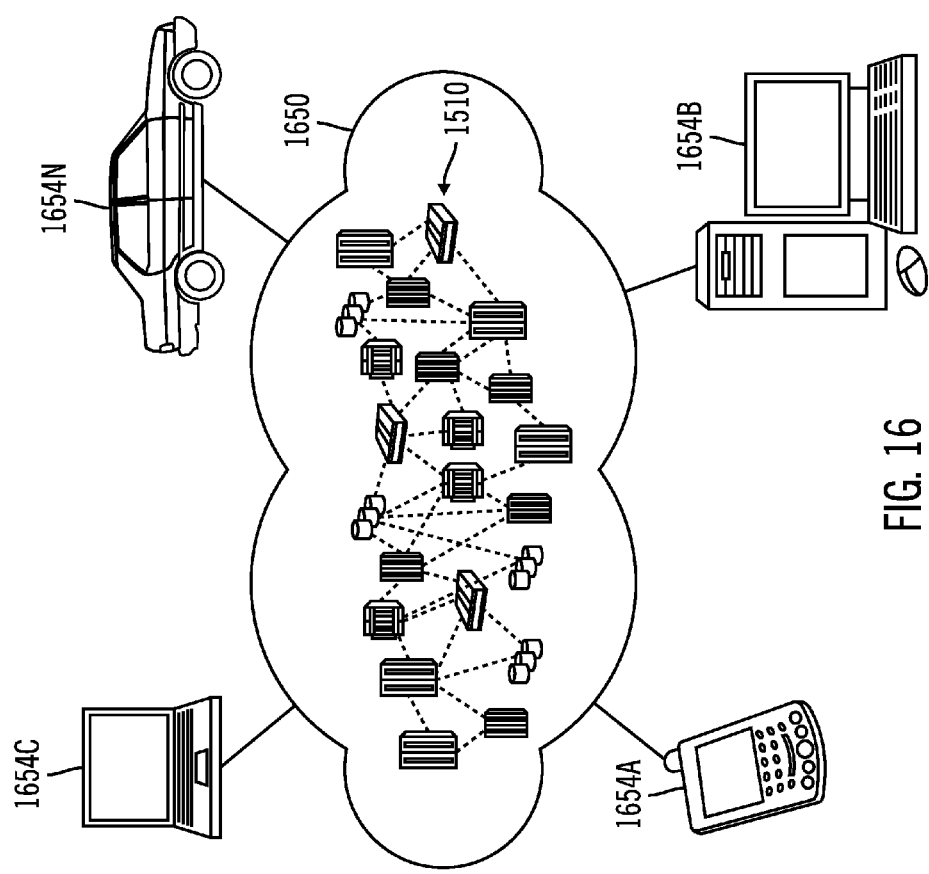
FIG. 16 illustrates a cloud computing environment in accordance with certain embodiments.

Referring now to FIG. 16, illustrative cloud computing environment 1650 is depicted. As shown, cloud computing environment 1650 comprises one or more cloud computing nodes 1510 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1510 and cloud computing environment 1650 can communicate with any type of computerized device over any type of network and/or network addressable connection (e.g., using a web browser).

Figure 17:
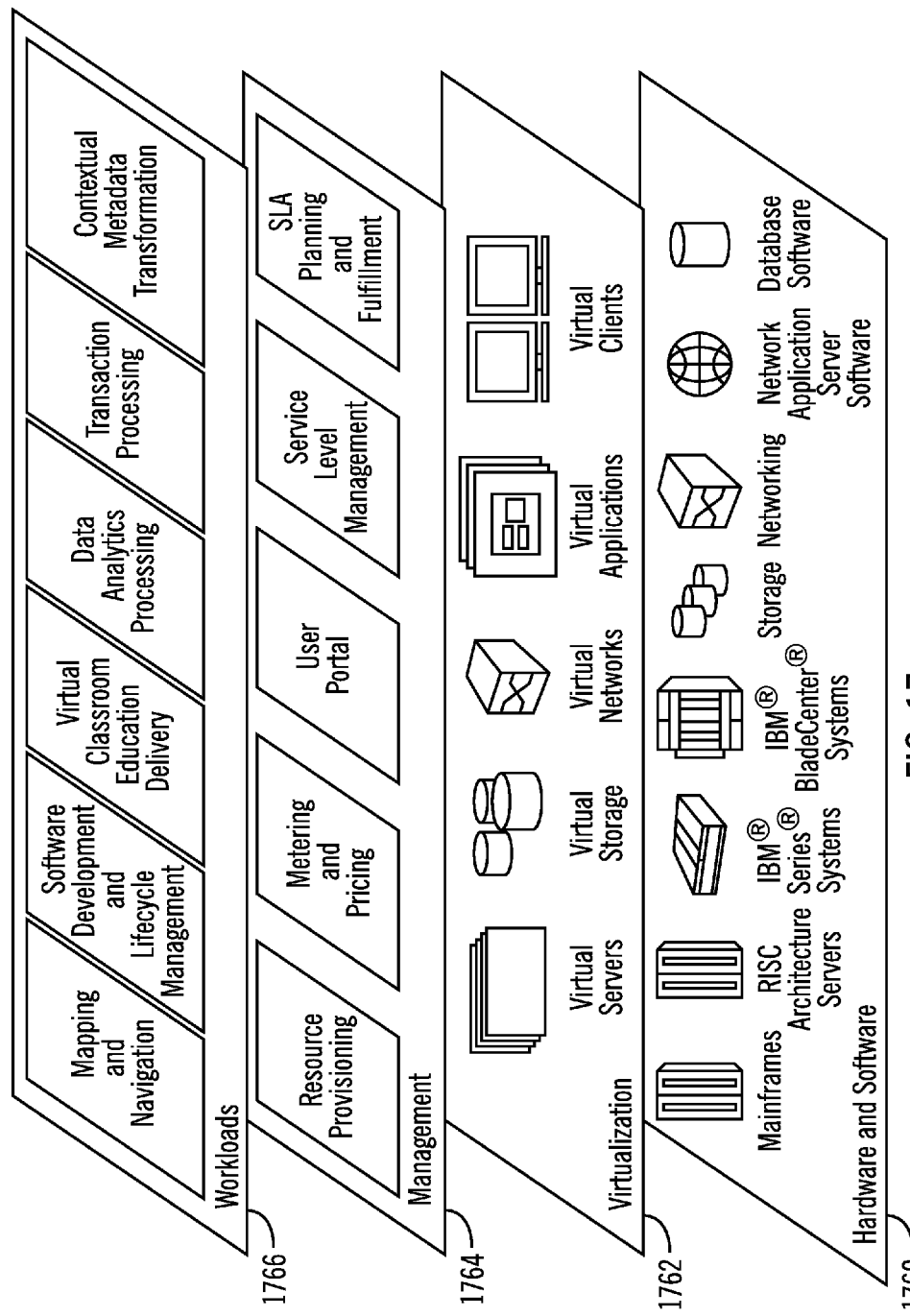
FIG. 17 illustrates abstraction model layers in accordance with certain embodiments.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1762 provides an abstraction layer from which the following examples of virtual entities may be provided: virtual servers; virtual storage; virtual networks, including virtual private networks; virtual applications and operating systems; and virtual clients.

In one example, management layer 1764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and contextual metadata transformation.

Thus, in certain embodiments, software or a program, implementing contextual metadata transformation in accordance with embodiments described herein, is provided as a service in a cloud environment.

In certain embodiments, the computing device 100 has the architecture of computing node 1510. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a non-transitory computer readable storage medium having program code embodied therewith, the program code executable by at least one processor to perform:

obtaining source system metadata containing source contextual values of a source system that are based on user settings, system configuration, and data processing configuration, wherein the source contextual values indicate how source attributes are to be processed in the source system;

obtaining a structural transformation map between the source system and a target system, (1) that has an associated structural transformation map schema definition, (2) that maps a source schema of the source system to a target schema of the target system, (3) that includes source attribute to target attribute pairs, and (4) that includes additional data used to map data from the source system to the target system;

generating, from the structural transformation map, a simplified map (1) that is a simpler data structure of the structural transformation map, (2) that includes the source attribute to target attribute pairs for structural mappings, and (3) that does not include the additional data, by sending the structural transformation map through a map simplifier;

generating a metadata transform input schema definition from the associated structural transformation map schema definition and a generic metadata schema definition that provides a generic mechanism for defining data for business functions of various types;

generating a first document that includes combined data, that conforms to the metadata transform input schema definition, using data from the simplified map and the source system metadata;

generating a second document containing target contextual values of target system metadata that map to the source contextual values using the combined data and a contextual metadata transformation map, wherein the target contextual values indicate how target attributes are to be processed in the target system; and dynamically configuring a business function of an application of the target system using the target contextual values.

2. The computer program product of claim 1, wherein the source system metadata is one of static data and dynamically retrieved data.

3. The computer program product of claim 1, wherein the program code is executable by the at least one processor to perform:

in response to determining that the source contextual values at the source system have changed, generating changed, transformed target contextual values at the target system.

4. The computer program product of claim 1, wherein a Software as a Service (SaaS) is configured to perform computer program product operations.

5. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform:

obtaining source system metadata containing source contextual values of a source system that are based on user settings, system configuration, and data processing configuration, wherein the source contextual values indicate how source attributes are to be processed in the source system;

obtaining a structural transformation map between the source system and a target system, (1) that has an associated structural transformation map schema definition, (2) that maps a source schema of the source system to a target schema of the target system, (3) that includes source attribute to target attribute pairs, and (4) that includes additional data used to map data from the source system to the target system;

generating, from the structural transformation map, a simplified map (1) that is a simpler data structure of the structural transformation map, (2) that includes the source attribute to target attribute pairs for structural mappings, and (3) that does not include the additional data, by sending the structural transformation map through a map simplifier;

generating a metadata transform input schema definition from the associated structural transformation map schema definition and a generic metadata schema definition that provides a generic mechanism for defining data for business functions of various types;

generating a first document that includes combined data, that conforms to the metadata transform input schema definition, using data from the simplified map and the source system metadata;

generating a second document containing target contextual values of target system metadata that map to the source contextual values using the combined data and a contextual metadata transformation map, wherein the target contextual values indicate how target attributes are to be processed in the target system; and dynamically configuring a business function of an application of the target system using the target contextual values.

6. The computer system of claim 5, wherein the source system metadata is one of static data and dynamically retrieved data.

7. The computer system of claim 5, wherein the program instructions are stored on the at least one of the one or more storage devices for execution by the at least one of the one or more processors via the at least one of the one or more memories to perform:

in response to determining that the source contextual values at the source system have changed, generating changed, transformed target contextual values at the target system.

8. The computer system of claim 5, wherein a Software as a Service (SaaS) is provided to perform system operations.

* * * * *